US011781290B2

United States Patent
Kurokawa et al.

(10) Patent No.: US 11,781,290 B2
(45) Date of Patent: Oct. 10, 2023

(54) SHOVEL AND OUTPUT DEVICE OF SHOVEL

(71) Applicant: SUMITOMO CONSTRUCTION MACHINERY CO., LTD., Tokyo (JP)

(72) Inventors: Tomoki Kurokawa, Chiba (JP); Hiroyuki Tsukamoto, Chiba (JP)

(73) Assignee: SUMITOMO CONSTRUCTION MACHINERY CO., LTD., Tokyo (JP)

( * ) Notice: Subject to any disclaimer, the term of this patent is extended or adjusted under 35 U.S.C. 154(b) by 327 days.

(21) Appl. No.: 16/907,721

(22) Filed: Jun. 22, 2020

(65) Prior Publication Data

US 2020/0318321 A1 Oct. 8, 2020

Related U.S. Application Data

(63) Continuation of application No. PCT/JP2018/048343, filed on Dec. 27, 2018.

(30) Foreign Application Priority Data

Dec. 27, 2017 (JP) .................. 2017-252214

(51) Int. Cl.
*E02F 9/24* (2006.01)
*E02F 3/40* (2006.01)
(Continued)

(52) U.S. Cl.
CPC .................. *E02F 9/24* (2013.01); *E02F 3/40* (2013.01); *E02F 9/166* (2013.01); *E02F 9/26* (2013.01)

(58) Field of Classification Search
CPC ...... B60R 1/00; E02F 9/24; E02F 3/40; E02F 9/166; E02F 9/26; E02F 3/32; G06T 3/00
See application file for complete search history.

(56) References Cited

U.S. PATENT DOCUMENTS 9,432,634 B2    8/2016 Kiyota
2002/0161541 A1* 10/2002 Hou ...................... G01L 25/00
                                                 702/105
(Continued)

FOREIGN PATENT DOCUMENTS

JP    H05-330449        12/1993
JP    H06-060659 U       8/1994
(Continued)

OTHER PUBLICATIONS

JP2008240362A translate.*
International Search Report for PCT/JP2018/048343 dated Mar. 19, 2019.

*Primary Examiner* — Tyler J Lee
*Assistant Examiner* — Yufeng Zhang
(74) *Attorney, Agent, or Firm* — IPUSA, PLLC

(57) ABSTRACT

A shovel includes a lower traveling body, an upper turning body turnably mounted on the lower traveling body, a cab provided on the upper turning body, an orientation detector configured to detect the relative relationship between the orientation of the upper turning body and the orientation of the lower traveling body, and an alarm device configured to output an alarm when a backward travel operation is performed while it is detected by the orientation detector that the orientation of the upper turning body and the orientation of the lower traveling body are in a predetermined relationship. The backward travel operation is an operation to cause the lower traveling body to travel in the backward direction of the upper turning body.

14 Claims, 17 Drawing Sheets

(51) Int. Cl.
*E02F 9/16* (2006.01)
*E02F 9/26* (2006.01)

(56) References Cited

U.S. PATENT DOCUMENTS

| | | | |
|---|---|---|---|
| 2007/0164873 A1 | 7/2007 | Yamada et al. | |
| 2014/0118533 A1 | 5/2014 | Chang | |
| 2016/0282465 A1* | 9/2016 | Sherlock | ............... G01S 13/931 |
| 2017/0028919 A1 | 2/2017 | Izumikawa et al. | |
| 2019/0248289 A1* | 8/2019 | Ishihara | .................. B66C 23/90 |

FOREIGN PATENT DOCUMENTS

| | | |
|---|---|---|
| JP | H08-338050 | 12/1996 |
| JP | 3394683 | 4/2003 |
| JP | 2005-248503 | 9/2005 |
| JP | 2006-195877 | 7/2006 |
| JP | 2008-095307 | 4/2008 |
| JP | 2008-162335 | 7/2008 |
| JP | 2008-240362 | 10/2008 |
| JP | 2009-227076 | 10/2009 |
| JP | 2010-059653 | 3/2010 |
| JP | 2012-109741 | 6/2012 |
| WO | 2015/163381 | 10/2015 |

* cited by examiner

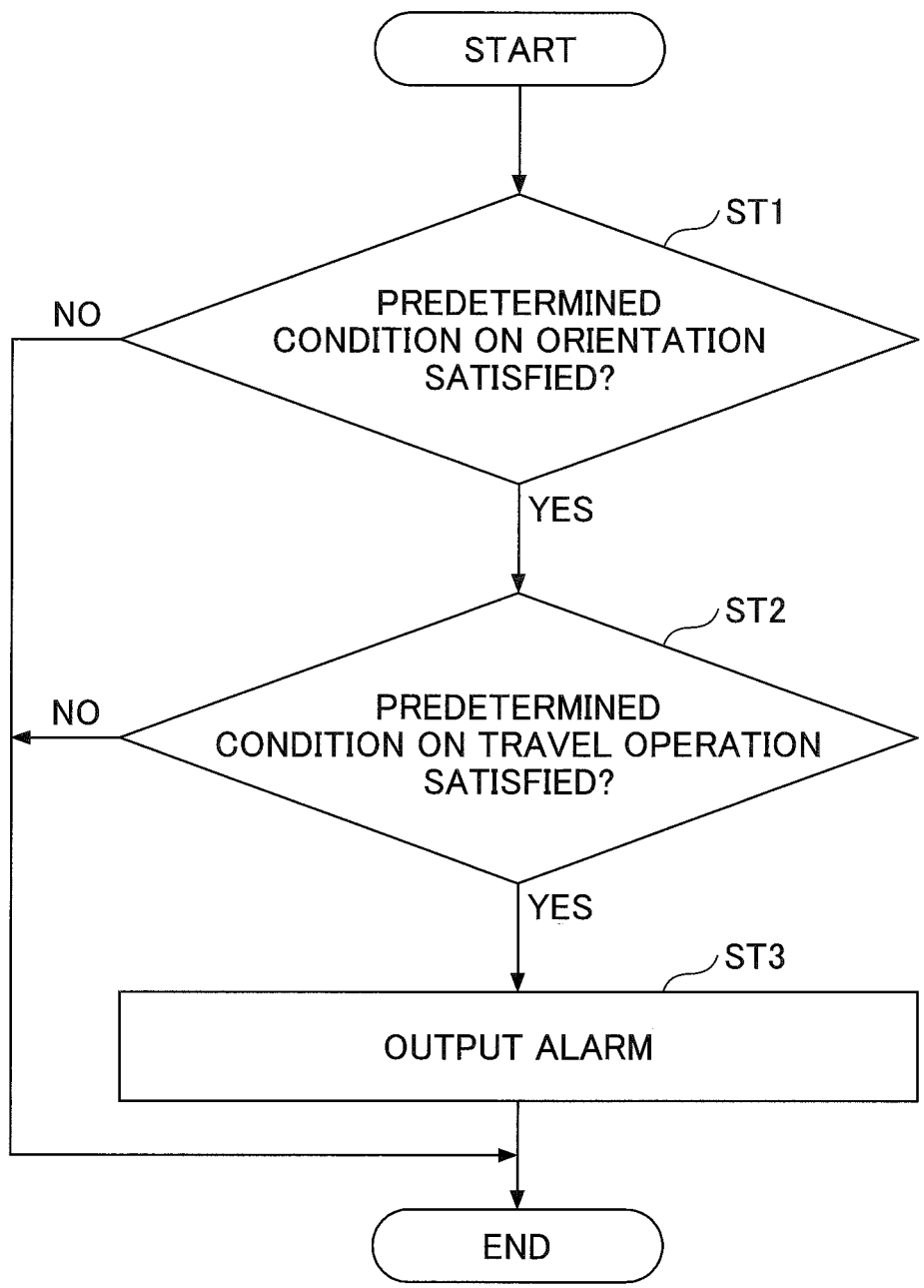

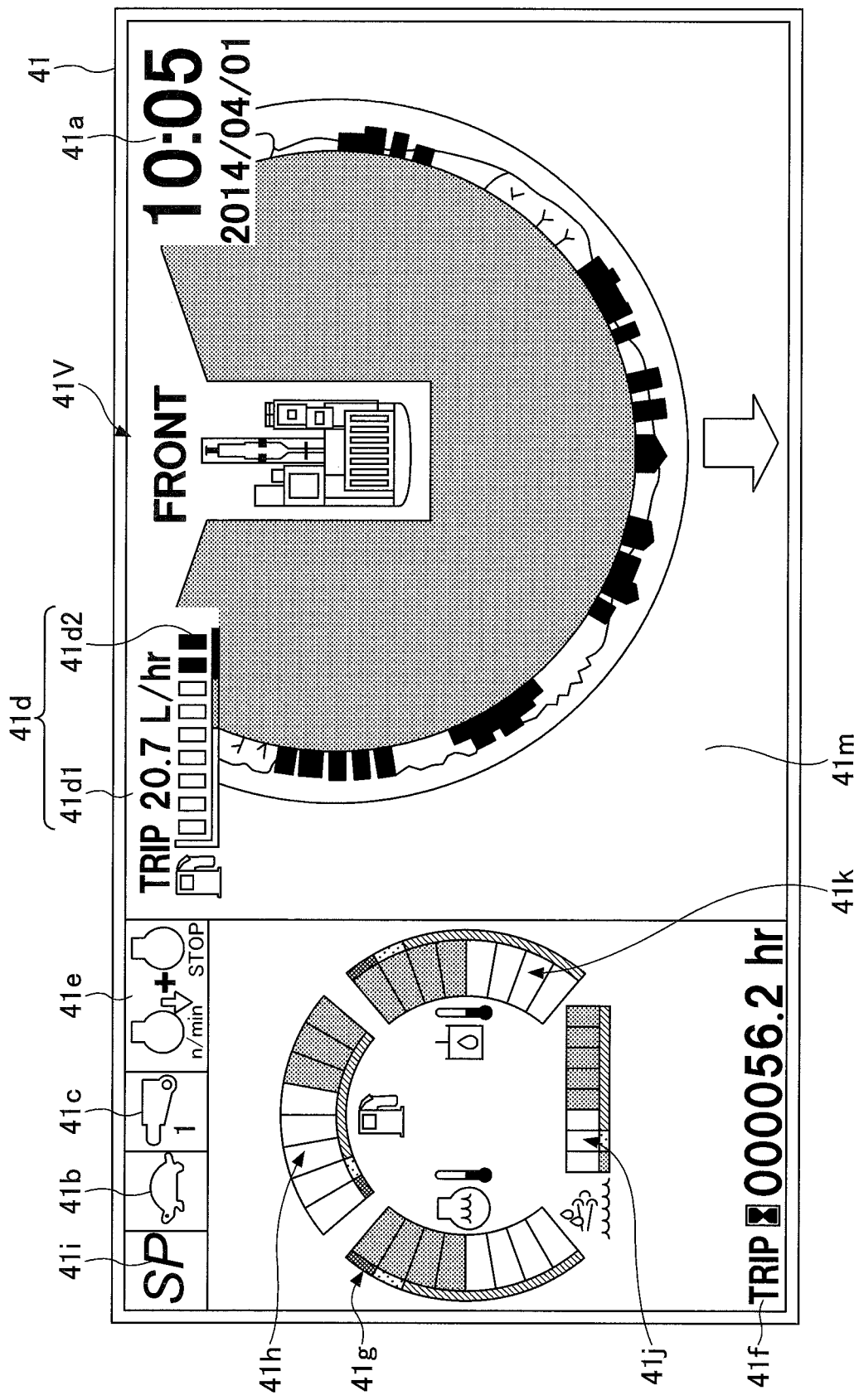

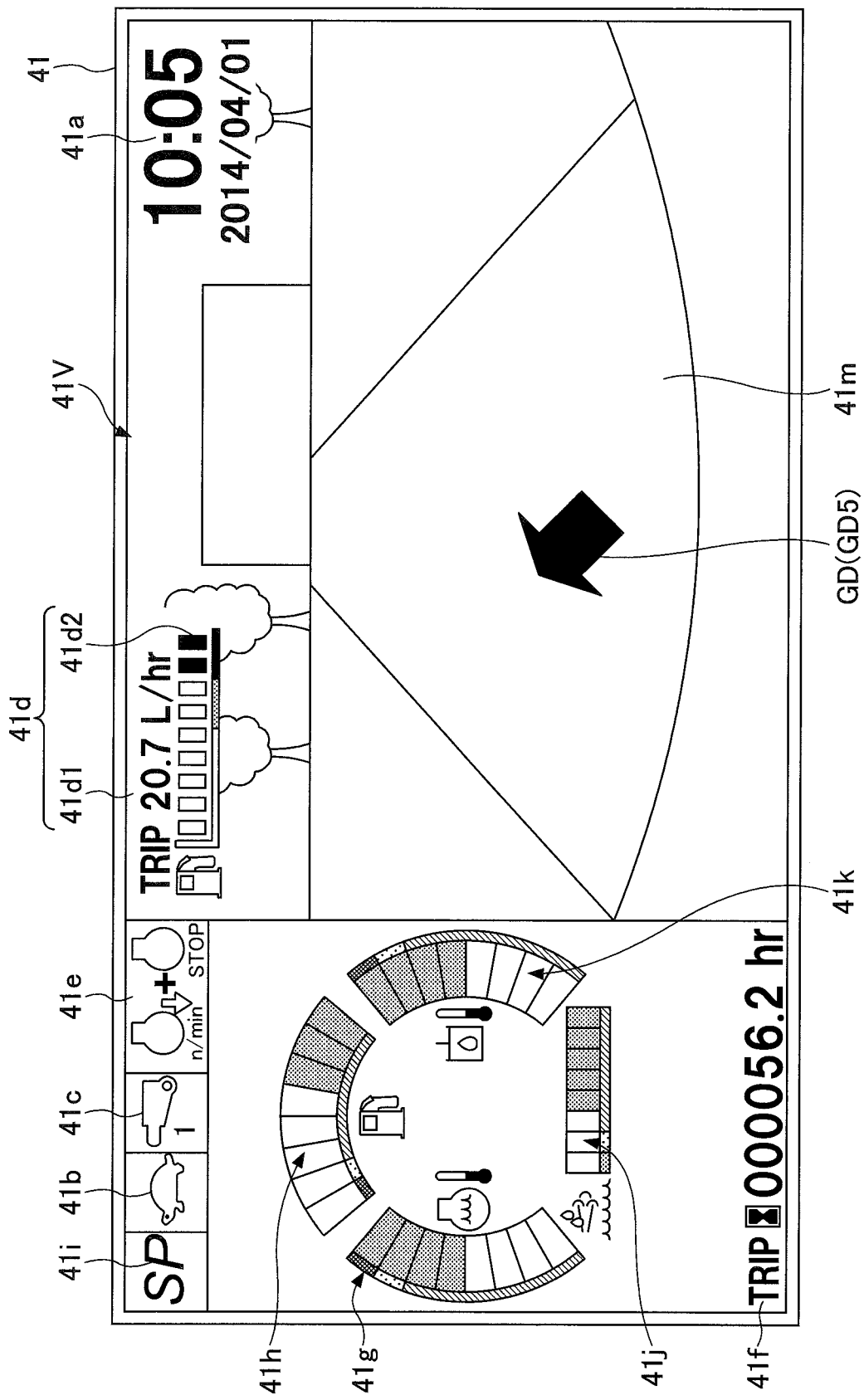

SHOVEL AND OUTPUT DEVICE OF SHOVEL

CROSS-REFERENCE TO RELATED APPLICATIONS

This application is a continuation application filed under 35 U.S.C. 111(a) claiming benefit under 35 U.S.C. 120 and 365(c) of PCT International Application No. PCT/JP2018/048343, filed on Dec. 27, 2018 and designating the U.S., which claims priority to Japanese patent application No. 2017-252214, filed on Dec. 27, 2017. The entire contents of the foregoing applications are incorporated herein by reference.

BACKGROUND

Technical Field

The present disclosure relates to shovels and output devices of shovels.

Description of Related Art

A shovel on which a camera that captures an image of the area behind and a display device that displays the output image of the camera are mounted has been known. According to this shovel, an operator can check the area behind by looking at the image displayed on the display device when moving back the shovel.

SUMMARY

According to an aspect of the present invention, a shovel includes a lower traveling body, an upper turning body turnably mounted on the lower traveling body, a cab provided on the upper turning body, an orientation detector configured to detect the relative relationship between the orientation of the upper turning body and the orientation of the lower traveling body, and an alarm device configured to output an alarm when a backward travel operation is performed while it is detected by the orientation detector that the orientation of the upper turning body and the orientation of the lower traveling body are in a predetermined relationship. The backward travel operation is an operation to cause the lower traveling body to travel in the backward direction of the upper turning body.

BRIEF DESCRIPTION OF THE DRAWINGS

FIG. 3 is a flowchart of an alarm process;

FIG. 7 is a diagram illustrating an example configuration of a main screen;

FIG. 8 is a diagram illustrating another example configuration of the main screen;

DETAILED DESCRIPTION

Displaying an image on the display device alone, however, cannot call the operator's attention satisfactorily, so that the operator may fail to check backward before moving back the shovel.

Therefore, it is desired to provide a shovel that can call the attention of a person engaged in shovel work when operated to move back.

According to an embodiment, a shovel that can call the attention of a person engaged in shovel work when operated to move back is provided.

Figure 1A:
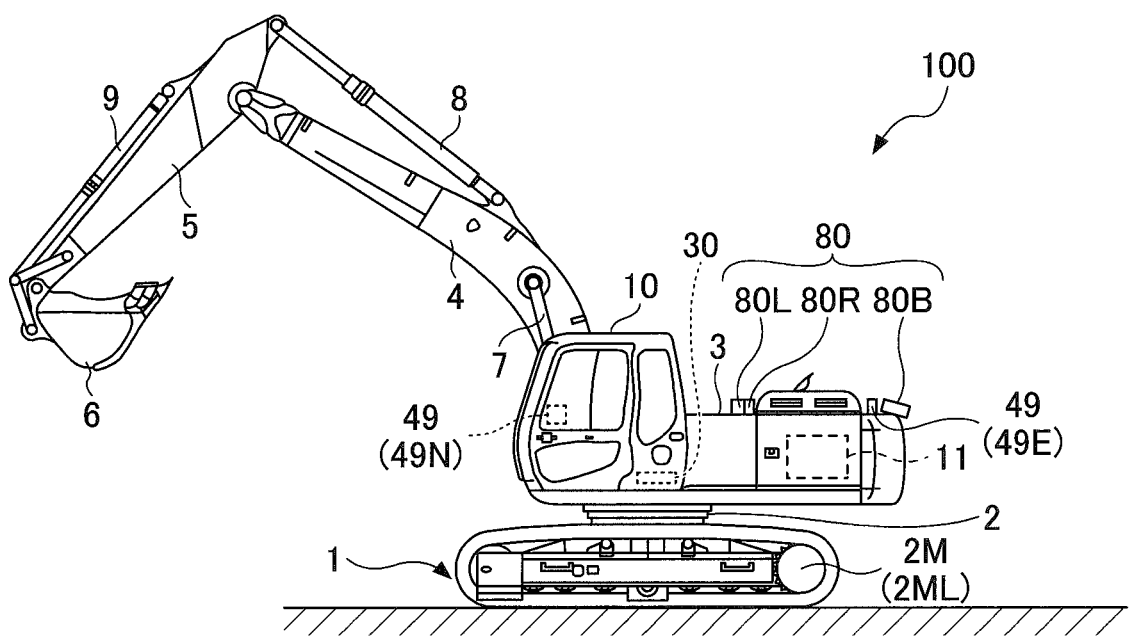
FIG. 1A is a side view of a shovel according to an embodiment of the present invention.

First, a shovel 100 serving as an excavator according to an embodiment of the present invention is described with reference to FIGS. 1A and 1B. FIG. 1A is a side view of the shovel 100 and FIG. 1B is a plan view of the shovel 100.

Figure 1B:
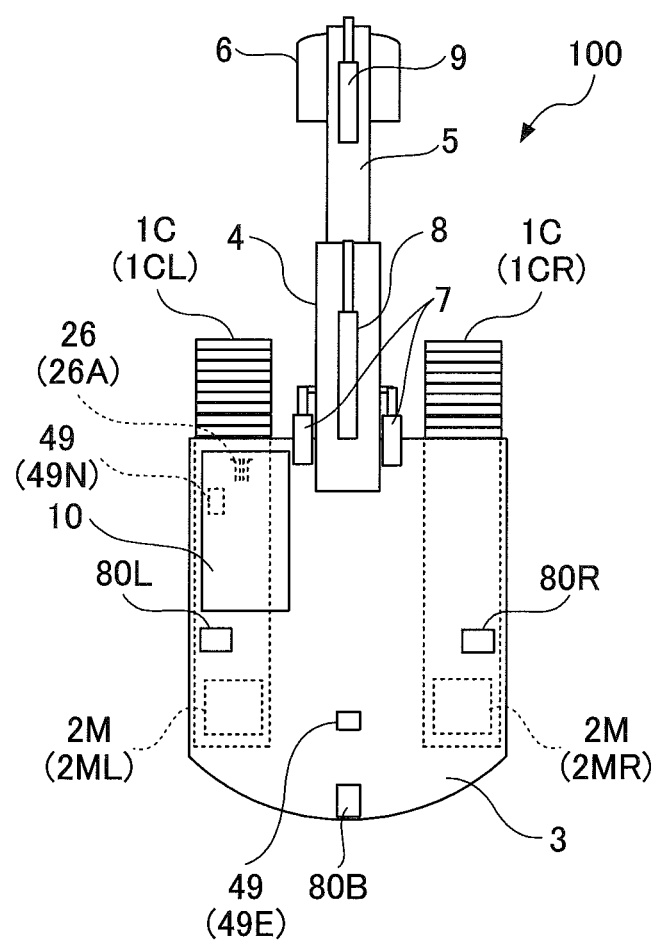
FIG. 1B is a plan view of the shovel according to the embodiment of the present invention.

According to the example of FIGS. 1A and 1B, a lower traveling body 1 of the shovel 100 includes crawlers 1C. The crawlers 1C are driven by travel hydraulic motors 2M. Specifically, the crawlers 1C include a left crawler 1CL and a right crawler 1CR. The left crawler 1CL is driven by a left travel hydraulic motor 2ML and the right crawler 1CR is driven by a right travel hydraulic motor 2MR.

An upper turning body 3 is turnably mounted on the lower traveling body 1 via a turning mechanism 2. A boom 4 serving as a work element is attached to the upper turning body 3. An arm 5 serving as a work element is attached to the distal end of the boom 4. A bucket 6 serving as a work element and an end attachment is attached to the distal end of the arm 5. The boom 4 is driven by a boom cylinder 7, the arm 5 is driven by an arm cylinder 8, and the bucket 6 is driven by a bucket cylinder 9. A cab (cabin 10) is provided and a power source such as an engine 11 is mounted on the upper turning body 3. Furthermore, a turning hydraulic motor, a controller 30, a camera 80, etc., are attached to the upper turning body 3. The turning hydraulic motor may alternatively be a turning motor generator. An operating apparatus 26, an alarm device, etc., are provided in the cabin 10. In this specification, for convenience, the side of the upper turning body 3 on which work elements such as the boom 4 are attached is defined as the front side, and the side of the upper turning body 3 on which a counterweight is attached is defined as the back side.

The controller 30 is a control device for controlling the shovel 100. According to the example of FIGS. 1A and 1B, the controller 30 is constituted of a computer including a CPU, a RAM, an NVRAM, and a ROM. In this case, the controller 30 reads programs corresponding to various functional elements from the ROM, loads the programs into the RAM, and causes the CPU to execute corresponding processes.

The camera 80 captures an image of an area surrounding the shovel 100. The camera 80 may be either a monocular camera or a stereo camera. According to the example of FIGS. 1A and 1B, the camera 80 includes a back camera 80B attached to the back end of the upper surface of the upper turning body 3, a left camera 80L attached to the left end of the upper surface of the upper turning body 3, and a right camera 80R attached to the right end of the upper surface of the upper turning body 3. The camera 80 may include a front camera to capture an image of a space in front of the shovel 100. The camera 80 may also operate as an object detector to detect a predetermined object within a predetermined area around the shovel 100. In this case, the camera 80 may include an image processor. The image processor performs various kinds of image processing on an image captured by the camera 80 (input image) to detect an image of a predetermined object included in the input image. In response to detecting an image of the predetermined object, the camera 80 outputs an object detection signal to the controller 30. The predetermined object includes at least one of a person, an animal, a vehicle, and a machine. The image processor may also be configured to detect a moving body. The image processor may be integrated with the controller 30. The object detector may also be a LIDAR, an ultrasonic sensor, a millimeter wave sensor, a laser radar sensor, an infrared sensor, or the like.

Figure 2:
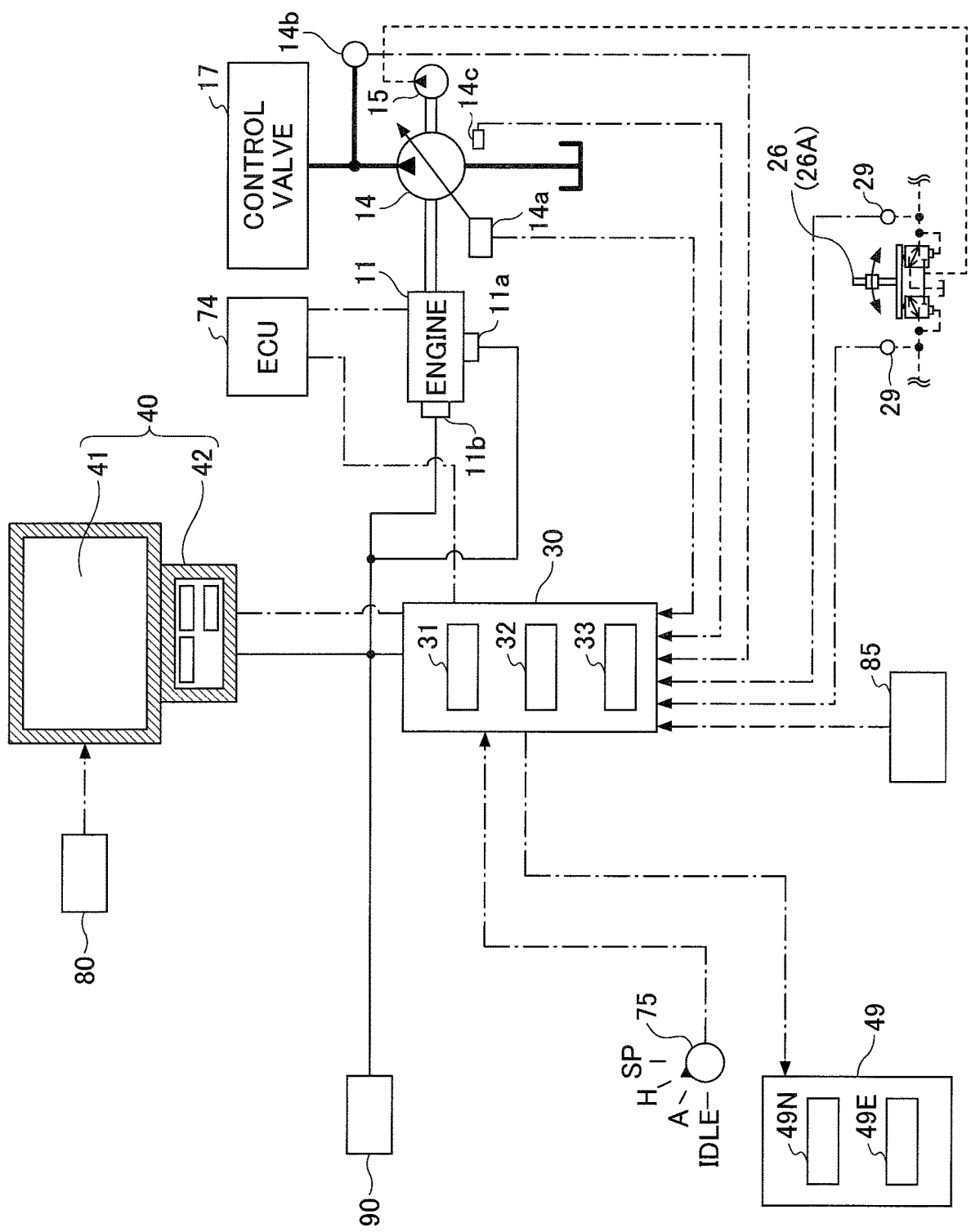
FIG. 2 is a schematic diagram illustrating an example configuration of a basic system installed in the shovel.

The camera 80 may also be configured to detect a relative relationship between the orientation of the upper turning body 3 and the orientation of the lower traveling body 1 (hereinafter also referred to as "orientation-related information"). In this case, the image processor performs various kinds of image processing on an image captured by the camera 80 (input image) to detect an image of the lower traveling body included in the input image. For example, the image processor identifies a longitudinal direction of the lower traveling body 1 by detecting an image of the lower traveling body 1 using various image recognition techniques. The image processor then derives an angle formed between the longitudinal axis of the upper turning body 3 and a virtual line corresponding to the longitudinal direction of the lower traveling body 1. In particular, the crawlers 1C protrude from the upper turning body 3. Therefore, the image processor can detect the orientation-related information by detecting an image of the crawlers 1C. In this case, the image processor may be integrated with the controller 30. When the camera 80 is not used to detect the orientation-related information, an orientation detector 85 may be separately provided as illustrated in FIG. 2.

The orientation detector 85 is configured to detect the orientation-related information. For example, the orientation detector 85 may be constituted of a combination of a direction sensor attached to the lower traveling body 1 and a direction sensor attached to the upper turning body 3. Specifically, the orientation detector 85 may derive the orientation-related information from the position information of each of GNSS receivers provided one on each of the lower traveling body 1 and the upper turning body 3. Furthermore, according to a configuration where the upper turning body 3 is driven to turn by a turning motor generator, the orientation detector 85 may be constituted of a resolver.

Furthermore, the orientation detector 85 may be constituted of a combination of one or more proximity sensors attached along the circumference of an upper ball race provided on the upper turning body 3 and one or more dogs (protrusions or recesses) formed along the circumference of a lower ball race provided on the lower traveling body 1. A proximity sensor configured to switch on in the proximity of dogs may be replaced with an ultrasonic sensor, a magnetic sensor, a photodetector, or the like.

Next, a basic system installed in the shovel 100 is described with reference to FIG. 2. FIG. 2 is a diagram illustrating an example configuration of the basic system installed in the shovel 100. In FIG. 2, a mechanical power transmission line, a hydraulic oil line, a pilot line, an electric power line, and an electrical control line are indicated by a double line, a thick solid line, a dashed line, a thin solid line, and a one-dot chain line, respectively.

The basic system mainly includes the engine 11, a main pump 14, a pilot pump 15, a control valve 17, the operating apparatus 26, an operating pressure sensor 29, the controller 30, and an alarm device 49.

The engine 11 is a diesel engine that adopts isochronous control to maintain a constant engine rotational speed irrespective of an increase or decrease in an engine load. The amount of fuel injection, the timing of fuel injection, boost pressure, etc., in the engine 11 are controlled by an engine control unit (ECU 74).

The engine 11 is connected to each of the main pump 14 and the pilot pump 15 serving as hydraulic pumps. The main pump 14 is connected to the control valve 17 via a hydraulic oil line.

The control valve 17 is a hydraulic control device that controls the hydraulic system of the shovel 100. The control valve 17 is connected to hydraulic actuators such as the left travel hydraulic motor 2ML, the right travel hydraulic motor 2MR, the boom cylinder 7, the arm cylinder 8, the bucket cylinder 9, and the turning hydraulic motor.

Specifically, the control valve 17 includes spool valves corresponding to the hydraulic actuators. Each spool valve is configured to be able to change its position according to a pilot pressure so as to be able to increase and decrease the opening area of a PC port and the opening area of a CT port. The PC port is a port that causes the main pump 14 to communicate with a hydraulic actuator, that is, causes hydraulic oil to flow through a conduit connecting the main pump 14 and a hydraulic actuator. The CT port is a port that causes a hydraulic actuator to communicate with a hydraulic oil tank.

The pilot pump 15 is a hydraulic pump for supplying hydraulic oil to various hydraulic control apparatuses via a pilot line. The pilot pump 15 is, for example, a fixed displacement hydraulic pump. The pilot pump 15, however, may be omitted. In this case, the function carried by the pilot pump 15 may be implemented by the main pump 14. That is, the main pump 14 may have the function of supplying hydraulic oil to the operating apparatus 26, etc., after reducing the pressure of the hydraulic oil with a throttle or the like, apart from the function of supplying hydraulic oil to the control valve 17.

According to this embodiment, the pilot pump 15 is connected to the operating apparatus 26 via a pilot line. The operating apparatus 26 includes, for example, a travel operating apparatus 26A. The travel operating apparatus 26A includes, for example, a travel lever and a travel pedal. According to this embodiment, each operating apparatus 26 is a hydraulic operating apparatus and is connected to the pilot ports of a corresponding spool valve in the control valve 17 via a pilot line. The operating apparatus 26 may alternatively be an electrical operating apparatus.

The operating pressure sensor 29 detects the details of the operation of the operating apparatus 26 in the form of pressure. The operating pressure sensor 29 outputs a detection value to the controller 30. The details of the operation of the operating apparatus 26 may also be electrically detected.

A display device 40 is connected to the controller 30. The display device 40 may be connected to the controller 30 via a communications network such as a CAN or may be connected to the controller 30 via a dedicated line. The display device 40 includes an image display part 41 and a switch panel 42 serving as an input part. The switch panel 42 is a panel including various hardware switches. The switch panel 42 may also be a touchscreen.

The display device 40 is supplied with electric power from a rechargeable battery 90 to operate. The rechargeable battery 90 is charged with electric power generated in an alternator 11a of the engine 11, for example. The electric power of the rechargeable battery 90 is also supplied to the controller 30, etc. For example, a starter 11b of the engine 11 is driven with electric power from the rechargeable battery 90 to start the engine 11.

The ECU 74 transmits data representing the condition of the engine 11, such as coolant water temperature, to the controller 30. A regulator 14a of the main pump 14 transmits data representing a swash plate tilt angle to the controller 30. A discharge pressure sensor 14b transmits data representing the discharge pressure of the main pump 14 to the controller 30. An oil temperature sensor 14c provided in a conduit between the hydraulic oil tank and the main pump 14 transmits data representing the temperature of hydraulic oil flowing through the conduit to the controller 30. The operating pressure sensor 29 transmits data representing a pilot pressure generated when the operating apparatus 26 is operated to the controller 30. The controller 30 can store these data in a temporary storage part (memory) and transmit them to the display device 40 when necessary.

An engine rotational speed adjustment dial 75 is a dial for adjusting the rotational speed of the engine 11. The engine rotational speed adjustment dial 75 transmits data indicating the setting of the engine rotational speed to the controller 30. The engine rotational speed adjustment dial 75 is configured to enable the engine rotational speed to be switched among the four levels of SP mode, H mode, A mode, and IDLE mode. The SP mode is a rotational speed mode selected when it is desired to prioritize workload, and uses the highest engine rotational speed. The H mode is a rotational speed mode selected when it is desired to satisfy both workload and fuel efficiency, and uses the second highest engine rotational speed. The A mode is a rotational speed mode selected when it is desired to operate the shovel 100 with low noise while prioritizing fuel efficiency, and uses the third highest engine rotational speed. The IDLE mode is a rotational speed mode selected when it is desired to idle the engine 11, and uses the lowest engine rotational speed. The engine 11 is controlled to operate constantly at the engine rotational speed of a rotational speed mode set by the engine rotational speed adjustment dial 75.

The alarm device 49 is an example of an output device of the shovel 100 that calls the attention of a person engaged in the work of the shovel 100 (hereinafter "notification target person") by outputting information on the shovel 100. The alarm device 49 is constituted of, for example, a combination of an interior alarm device 49N and an exterior alarm device 49E. The interior alarm device 49N is a device for calling the attention of the operator of the shovel 100 in the cabin 10, and includes, for example, at least one of an audio output device, a vibration generator, a light emitter, etc., provided in the cabin 10. The interior alarm device 49N may also be the display device 40. The exterior alarm device 49E is a device for calling the attention of a worker who works around the shovel 100, and includes, for example, at least one of an audio output device, a light emitter, etc., provided outside the cabin 10. An audio output device serving as the exterior alarm device 49E may be, for example, a travel alarm device attached to the bottom surface of the upper turning body 3. Furthermore, the exterior alarm device 49E may also be a light emitter provided on the upper turning body 3. The exterior alarm device 49E may be omitted.

Next, various functional elements of the controller 30 are described. According to this embodiment, the controller 30 includes a determining part 31, an alarm part 32, and an image generating part 33 as functional elements.

The determining part 31 determines whether a predetermined condition is satisfied. The predetermined condition includes, for example, a predetermined condition on the orientation of the lower traveling body 1 relative to the upper turning body 3. The predetermined condition on the orientation includes, for example, the angle formed between the longitudinal axis of the lower traveling body 1 and the longitudinal axis of the upper turning body 3 being within a predetermined range. Furthermore, the predetermined condition includes, for example, a predetermined condition on a travel operation. The predetermined condition on the travel operation includes, for example, a backward travel operation having been performed through the travel operating apparatus 26A. The backward travel operation is, for example, an operation to cause the lower traveling body 1 to travel in the backward direction of the upper turning body 3 or the cabin 10.

The alarm part 32 causes an alarm to be output when the determining part 31 determines that the predetermined condition is satisfied. According to this embodiment, the alarm part 32 causes an alarm to be output from the alarm device 49 when the determining part 31 determines that the predetermined condition on the orientation and the predetermined condition on the travel operation are satisfied.

The image generating part 33 generates an image to be displayed on the display device 40. According to this embodiment, the image generating part 33 generates, for example, an image to be displayed on the image display part 41 of the display device 40.

Here, a process of the controller 30 causing the alarm device 49 to output an alarm when a backward travel operation is performed (hereinafter, "alarm process") is described with reference to FIG. 3. FIG. 3 is a flowchart of the alarm process. The controller 30 repeatedly executes this alarm process at predetermined control intervals.

First, the determining part 31 of the controller 30 determines whether the predetermined condition on the orientation is satisfied (step ST1). According to this embodiment, the determining part 31 determines that the predetermined condition on the orientation is satisfied when the angle formed between the longitudinal axis of the lower traveling body 1 and the longitudinal axis of the upper turning body 3 is within a predetermined range.

Here, the predetermined condition on the orientation is described with reference to FIGS. 4A through 4H. FIGS. 4A through 4H are schematic diagrams of the shovel 100 as viewed from directly above. In each of FIGS. 4A through 4H, the lower traveling body 1 including the left crawler 1CL and the right crawler 1CR, the left travel hydraulic motor 2ML installed in a rear portion of the left crawler 1CL, and the right travel hydraulic motor 2MR installed in a rear portion of the right crawler 1CR are indicated by a dashed line. Furthermore, in each of FIGS. 4A through 4H, the upper turning body 3 and the cabin 10 provided on the upper turning body 3 are indicated by a solid line.

Figure 4A:
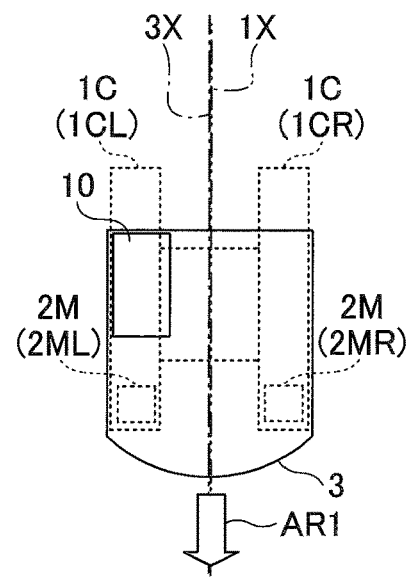
FIGS. 4A through 4H are schematic diagrams of the shovel as viewed from directly above.

More specifically, FIG. 4A illustrates a state where a longitudinal axis 1X of the lower traveling body 1 and a longitudinal axis 3X of the upper turning body 3 coincide with each other. Hereinafter, this state is referred to as "reference state." Furthermore, the angle formed between the longitudinal axis 1X and the longitudinal axis 3X becomes a positive value when the upper turning body 3 turns clockwise relative to the reference state and becomes a negative value when the upper turning body 3 turns counterclockwise relative to the reference state.

Figure 4B:
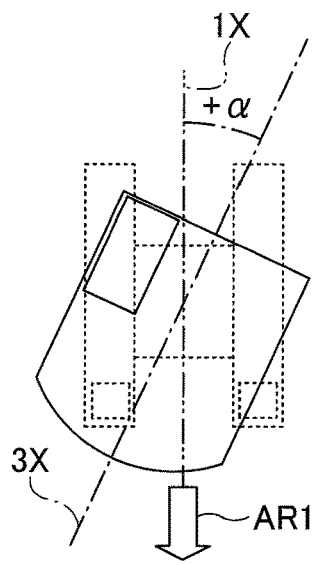

FIG. 4B illustrates a state where an angle (+α) is formed between the longitudinal axis 1X and the longitudinal axis 3X. That is, FIG. 4B illustrates a state where the upper turning body 3 is turned clockwise by an angle α relative to the reference state.

Figure 4C:
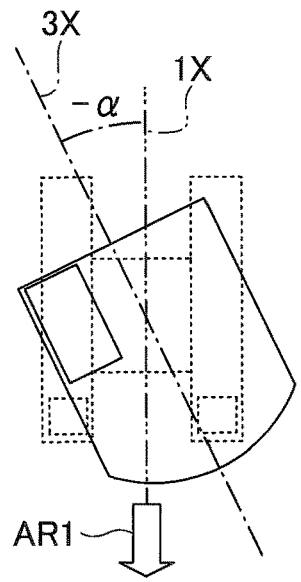

FIG. 4C illustrates a state where an angle (+α) is formed between the longitudinal axis 1X and the longitudinal axis 3X. That is, FIG. 4C illustrates a state where the upper turning body 3 is turned counterclockwise by the angle α relative to the reference state.

Figure 4D:
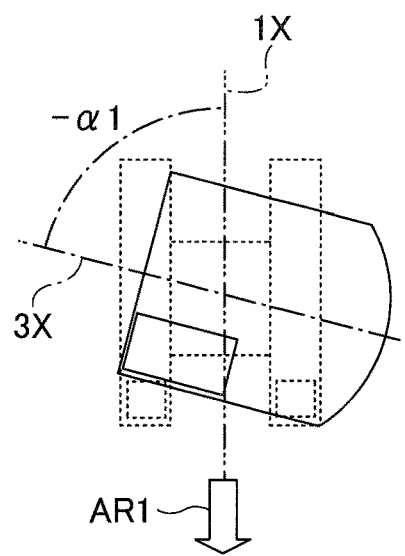

FIG. 4D illustrates a state where an angle (−α1) is formed between the longitudinal axis 1X and the longitudinal axis 3X. That is, FIG. 4D illustrates a state where the upper turning body 3 is turned counterclockwise by an angle α1 (>α) relative to the reference state.

The angle α is a threshold for determining whether the orientation of the lower traveling body 1 and the orientation of the upper turning body 3 are the same. According to this embodiment, the angle α is an angle more than 0 degrees and less than 90 degrees. In this specification, the travel of the lower traveling body 1 in the direction of arrow AR1 when the angle between the longitudinal axis 1X and the longitudinal axis 3X is more than or equal to 0 degrees and smaller than or equal to the angle α as illustrated in FIGS. 4A through 4C is referred to as "backward travel" of the shovel 100. The travel of the lower traveling body 1 in the direction of arrow AR1 when the angle between the longitudinal axis 1X and the longitudinal axis 3X is less than or equal to 90 degrees and greater than the angle α as illustrated in FIG. 4D is referred to "sideward travel" or "obliquely backward travel" of the shovel 100. When the angle between the longitudinal axis 1X and the longitudinal axis 3X is more than or equal to 0 degrees and smaller than or equal to the angle α, normally, the operator sitting in an operator seat in the cabin 10 cannot see travel hydraulic motors, idlers or the like attached to the lower traveling body 1. Therefore, the operator cannot determine the orientation of the lower traveling body 1 from the arrangement of travel hydraulic motors, idlers or the like. When the angle between the longitudinal axis 1X and the longitudinal axis 3X is less than or equal to 90 degrees and greater than the angle α, normally, the operator can see travel hydraulic motors, idlers or the like. Therefore, the operator can determine the orientation of the lower traveling body 1 from the arrangement of travel hydraulic motors, idlers or the like. The angle α is typically set such that such conditions are satisfied.

Figure 4E:
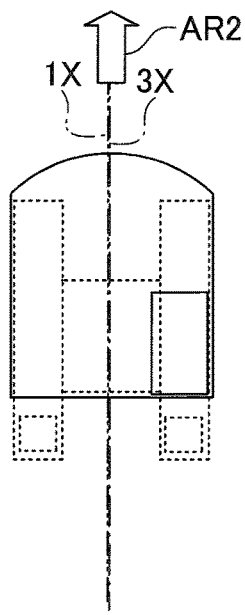

FIG. 4E illustrates a state where the angle between the longitudinal axis 1X and the longitudinal axis 3X is 180 degrees. That is, FIG. 4E illustrates a state where the upper turning body 3 is turned 180 degrees clockwise or counterclockwise relative to the reference state.

Figure 4F:
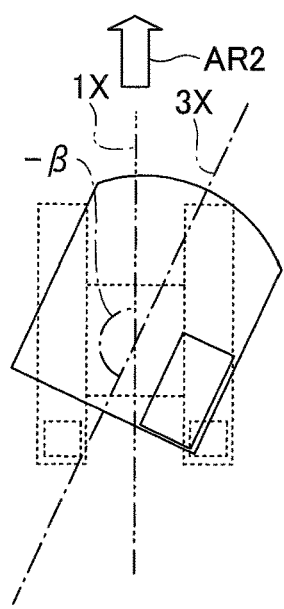

FIG. 4F illustrates a state where an angle (−β) is famed between the longitudinal axis 1X and the longitudinal axis 3X. That is, FIG. 4F illustrates a state where the upper turning body 3 is turned counterclockwise by an angle β relative to the reference state.

Figure 4G:
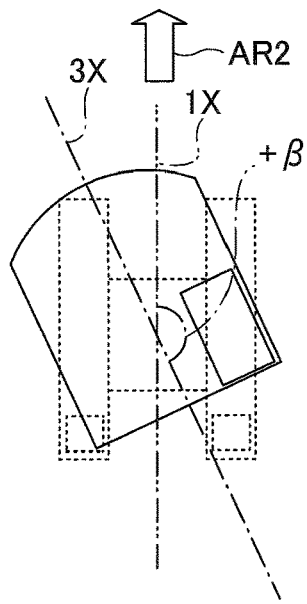

FIG. 4G illustrates a state where an angle (+β) is formed between the longitudinal axis 1X and the longitudinal axis 3X. That is, FIG. 4G illustrates a state where the upper turning body 3 is turned clockwise by the angle β relative to the reference state.

Figure 4H:
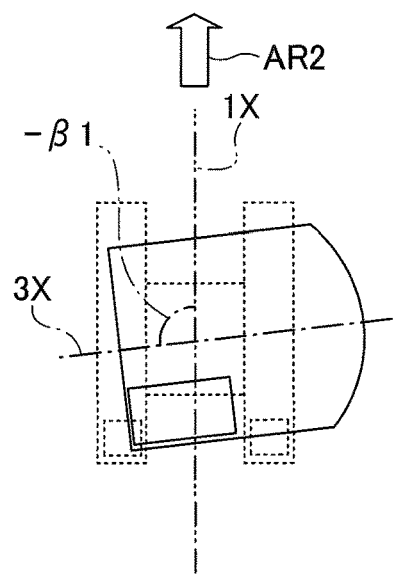

FIG. 4H illustrates a state where an angle (−β1) is formed between the longitudinal axis 1X and the longitudinal axis 3X. That is, FIG. 4H illustrates a state where the upper turning body 3 is turned counterclockwise by an angle β1 (<β) relative to the reference state.

The angle β is a threshold for determining whether the orientation of the lower traveling body 1 and the orientation of the upper turning body 3 are directly opposite to each other. According to this embodiment, the angle β is an angle more than 90 degrees and less than 180 degrees. The travel of the lower traveling body 1 in the direction of arrow AR2 when the angle between the longitudinal axis 1X and the β and less than or equal to 180 degrees as illustrated in FIGS. 4E through 4G is referred to as "backward travel" of the shovel 100. The travel of the lower traveling body 1 in the direction of arrow AR2 when the angle between the longitudinal axis 1X and the longitudinal axis 3X is more than or equal to 90 degrees and smaller than the angle β as illustrated in FIG. 4H is referred to "sideward travel" or "obliquely backward travel" of the shovel 100. When the angle between the longitudinal axis 1X and the longitudinal axis 3X is greater than or equal to the angle β and less than or equal to 180 degrees, normally, the operator sitting in the operator seat in the cabin 10 cannot see travel hydraulic motors, idlers or the like attached to the lower traveling body 1. Therefore, the operator cannot determine the orientation of the lower traveling body 1 from the arrangement of travel hydraulic motors, idlers or the like. When the angle between the longitudinal axis 1X and the longitudinal axis 3X is more than or equal to 90 degrees and smaller than the angle β, normally, the operator can see travel hydraulic motors, idlers or the like. Therefore, the operator can determine the orientation of the lower traveling body 1 from the arrangement of travel hydraulic motors, idlers or the like. The angle β is typically set such that such conditions are satisfied.

When the angle formed between the longitudinal axis 1X of the lower traveling body 1 and the longitudinal axis 3X of the upper turning body 3 is within the range of −180 degrees to −β the range of −α to +α, or the range of +β to +180 degrees, the determining part 31 determines that the predetermined condition on the orientation is satisfied. For example, the determining part 31 determines that the predetermined condition on the orientation is satisfied when one of the states illustrated in FIGS. 4A through 4C and 4E through 4G is detected, and determines that the predetermined condition on the orientation is not satisfied when the state illustrated in FIG. 4D or 4H is detected.

In response to determining that the predetermined condition on the orientation is not satisfied (NO at step ST1), the determining part 31 ends the alarm process of this time without outputting an alarm.

In response to determining that the predetermined condition on the orientation is satisfied (YES at step ST1), the determining part 31 determines whether the predetermined condition on the travel operation is satisfied (step ST2). According to this embodiment, the determining part 31 determines that the predetermined condition on the travel operation is satisfied when a backward travel operation is performed.

For example, the determining part 31 determines that the predetermined condition on the travel operation is satisfied when at least one of the operation of pulling the travel lever to the near side and the operation of stepping on the travel pedal on its heel side is performed in the states illustrated in FIGS. 4A through 4C. This is because when the travel lever is pulled to the near side, that is, tilted backward, in the states illustrated in FIGS. 4A through 4C, the lower traveling body 1 travels in the direction indicated by arrow AR1. The same is true for the case where the travel pedal is pressed on the heel side. In this case, the operation of pulling the travel lever to the near side and the operation of stepping on the travel pedal on the heel side are included in the backward travel operation.

Furthermore, the determining part 31 determines that the predetermined condition on the travel operation is satisfied when at least one of the operation of pushing the travel lever to the far side and the operation of stepping on the travel pedal on its toe side is performed in the states illustrated in FIGS. 4E through 4G. This is because when the travel lever is pushed to the far side, that is, tilted forward, in the states illustrated in FIGS. 4E through 4G, the lower traveling body 1 travels in the direction indicated by arrow AR2. The same is true for the case where the travel pedal is pressed on the toe side. In this case, the operation of pushing the travel lever to the far side and the operation of stepping on the travel pedal on the toe side are included in the backward travel operation.

Specifically, the determining part 31 determines whether the backward travel operation has been performed with at least one of right and left travel operating apparatuses 26A, based on the output of the operating pressure sensor 29. For example, the determining part 31 determines that the backward travel operation has been performed when the reverse rotation side pilot pressure of a spool valve associated with the left travel hydraulic motor 2ML (hereinafter, "left travel spool valve") reaches or exceeds a threshold Pt, namely, in response to determining that a left travel lever has been pulled to the near side, in the state illustrated in FIG. 4A. As the reverse rotation side pilot pressure increases, the left travel spool valve changes its position to cause the main pump 14 to communicate with a first port of the left travel hydraulic motor 2ML and cause a second port of the left travel hydraulic motor 2ML to communicate with the hydraulic oil tank. As a result, the left travel hydraulic motor 2ML reverses to cause the left crawler 1CL to travel in the direction indicated by arrow AR1. When the left travel lever is pushed to the far side, the left travel spool valve causes the main pump 14 to communicate with the second port of the left travel hydraulic motor 2ML and causes the first port of the left travel hydraulic motor 2ML to communicate with the hydraulic oil tank as the forward rotation side pilot pressure increases. As a result, the left travel hydraulic motor 2ML rotates forward to cause the left crawler 1CL to travel in a direction directly opposite to the direction indicated by arrow AR1. That is, the left crawler 1CL travels forward.

Figure 5:
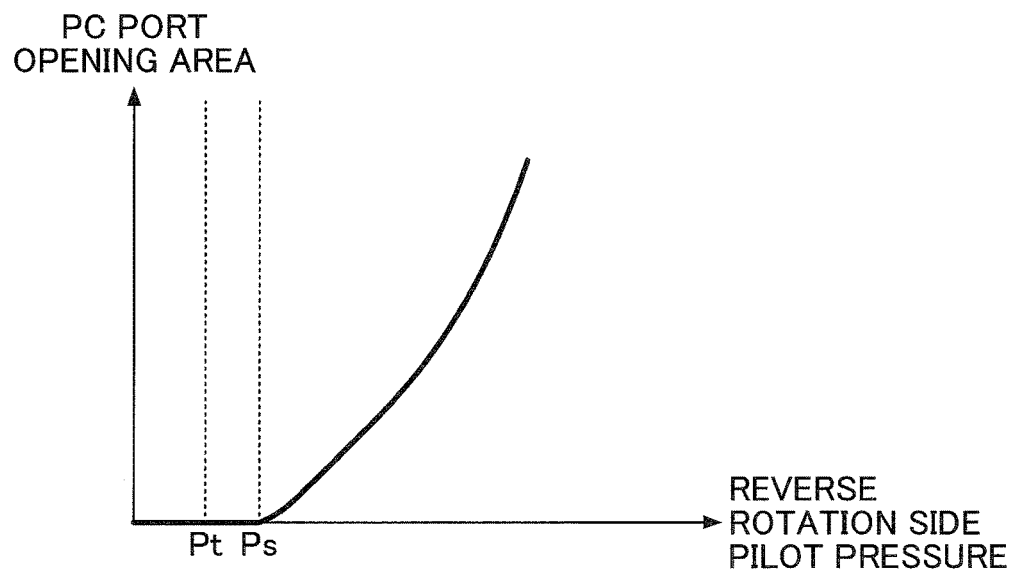
FIG. 5 is a graph illustrating the relationship between a pilot pressure and the opening area of a PC port.

According to this embodiment, the threshold Pt is set as a value within a dead zone region. The dead zone region means a range of pilot pressures that do not cause the left travel hydraulic motor 2ML to operate. FIG. 5 illustrates the relationship between the opening area of the PC port and the reverse rotation side pilot pressure that acts on the left travel spool valve when the left travel lever is pulled to the near side. In FIG. 5, the horizontal axis of FIG. 5 corresponds to the reverse rotation side pilot pressure and the vertical axis corresponds to the opening area of the PC port.

While FIG. 5 illustrates the case of pulling the left travel lever to the near side, the relationship illustrated in FIG. 5 is also applied to the case of pushing the left travel lever to the far side, the case of pulling a right travel lever to the near side, and the case of pushing the right travel lever to the far side.

As illustrated in FIG. 5, even when the left travel lever is pulled to the near side, the opening area of the PC port that causes the main pump 14 to communicate with the first port of the left travel hydraulic motor 2ML remains zero while the amount of operation of the left travel lever is so limited that the reverse rotation side pilot pressure is less than a threshold Ps, that is, in the dead zone region. Therefore, hydraulic oil discharged by the main pump 14 does not flow into the first port of the left travel hydraulic motor 2ML, so that the left travel hydraulic motor 2ML does not rotate. When the reverse rotation side pilot pressure is more than or equal to the threshold Ps, that is, has increased beyond the dead zone region, the opening area of the PC port is more than zero and increases as the reverse rotation side pilot pressure increases. Therefore, hydraulic oil discharged by the main pump 14 flows into the first port of the left travel hydraulic motor 2ML, so that the left travel hydraulic motor 2ML reverses.

Accordingly, when the threshold Pt is less than the threshold Ps, that is, when the threshold Pt is set as a value within the dead zone region, the determining part 31 can determine whether the predetermined condition on the travel operation is satisfied before the lower traveling body 1 starts to move. Therefore, the controller 30 can, for example, determine whether the backward travel operation has been performed before the lower traveling body 1 starts to move, and can output an alarm before the lower traveling body 1 starts to move in response to determining that the backward travel operation has been performed.

Furthermore, while determining whether the predetermined condition on the travel operation is satisfied based on a pilot pressure related to the travel operating apparatus 26A according to the above-described embodiment, the determining part 31 may also determine whether the predetermined condition on the travel operation is satisfied based on a drive pressure that is the pressure of hydraulic oil flowing into the travel hydraulic motors 2M. In this case, the drive pressure of the travel hydraulic motors 2M may be detected with drive pressure sensors attached to conduits that connect the travel hydraulic motors 2M and travel spool valves. The drive pressure sensors are desirably attached near the travel spool valves in the upper turning body 3. Alternatively, the determining part 31 may determine whether the predetermined condition on the travel operation is satisfied based on the tilt angle of a travel lever detected by an angle sensor or the like.

Furthermore, according to the above-described embodiment, the determining part 31 determines that the predetermined condition on the travel operation is satisfied when the backward travel operation is performed with at least one of the right and left travel operating apparatuses 26A. The determining part 31, however, may be configured not to determine that the predetermined condition on the travel operation is satisfied if a forward travel operation is performed with one of the right and left travel operating apparatuses 26A, even when the backward travel operation is performed with the other of the right and left travel operating apparatuses 26A. The forward travel operation is, for example, an operation to cause the lower traveling body 1 to travel in a forward direction of the upper turning body 3 or the cabin 10. According to this configuration, when a spin turn is performed, the determining part 31 does not determine that the predetermined condition on the travel operation is satisfied. Furthermore, the determining part 31 may determine that the predetermined condition on the travel operation is satisfied when the backward travel operation is performed with both of the right and left travel operating apparatuses 26A. According to this configuration, when a pivot turn or a spin turn is performed, the determining part 31 does not determine that the predetermined condition on the travel operation is satisfied. Furthermore, the determining part 31 may also be configured not to determine that the predetermined condition on the travel operation is satisfied if the difference between the amount of operation of the right and the amount of operation of the left is more than or equal to a predetermined value, even when the backward travel operation is performed with both of the right and left travel operating apparatuses 26A. According to this configuration, when a power turn is performed, the determining part 31 does not determine that the predetermined condition on the travel operation is satisfied.

In response to determining that the predetermined condition on the travel operation is not satisfied (NO at step ST2), the determining part 31 ends the alarm process of this time without outputting an alarm.

In response to determining that the predetermined condition on the travel operation is satisfied (YES at step ST2), the alarm part 32 of the controller 30 causes an alarm to be output (step ST3). This alarm (hereinafter, "backward travel alarm") includes, for example, at least one of a visual alarm, an aural alarm, and a tactile alarm. Furthermore, the notification target person includes at least one of the operator of the shovel 100 and a worker working around the shovel 100. According to this embodiment, the alarm part 32 causes an aural alarm to be output from the alarm device 49 to both of the operator in the cabin 10 and a worker outside the cabin 10.

Furthermore, the alarm part 32 may cause the backward travel alarm to be different in configuration from other alarms so that the notification target person can distinguish between the backward travel alarm and other alarms. For example, in the case of outputting the backward travel alarm as an aural alarm, the alarm part 32 may cause the backward travel alarm to be different in at least one of the amplitude, frequency, waveform, etc., of a sound.

Furthermore, the alarm part 32 may cause the backward travel alarm to differ in configuration between when the travel lever is pushed to the far side to move the shovel 100 backward and when the travel lever is pulled to the near side to move the shovel 100 backward. In particular, when the travel lever is pushed to the far side to move the shovel 100 backward, the operator may have intended to move the shovel 100 forward. Therefore, for example, the alarm part 32 may cause the backward travel alarm that is output when the travel lever is pushed to the far side to move the shovel 100 backward to be louder than the backward travel alarm that is output when the travel lever is pulled to the near side to move the shovel 100 backward. This is for ensuring an early notification to the operator that the shovel 100 is going to move in a direction different from the direction of movement intended by the operator. Furthermore, the alarm part 32 may cause the backward travel alarms to be different in at least one of the amplitude, frequency, waveform, etc., of a sound. Furthermore, the backward travel alarm may be output using a vibration generator or a light emitter provided in the cabin 10. For example, the alarm part 32 may cause the backward travel alarm that the vibration generator or light emitter outputs when the travel lever is pushed to the far side to move the shovel 100 backward to be different in configuration than the backward travel alarm that the vibration generator or light emitter outputs when the travel lever is pulled to the near side to move the shovel 100 backward. Furthermore, the alarm part 32 may output the backward travel alarm through an audio output device or a light emitter placed on the upper turning body 3, namely, placed outside the cabin 10.

As described above, the shovel 100 according to an embodiment of the present invention includes the lower traveling body 1, the upper turning body 3 turnably mounted on the lower traveling body 1, the cabin 10 serving as a cab provided on the upper turning body 3, the travel operating apparatus 26A provided in the cabin 10, the camera 80 configured to detect the relative relationship between the orientation of the upper turning body 3 and the orientation of the lower traveling body 1, and the alarm device 49 configured to output an alarm when a backward travel operation is performed through the travel operating apparatus 26A while it is detected by the camera 80 that the orientation of the upper turning body 3 and the orientation of the lower traveling body 1 are in a predetermined relationship. The camera 80 may serve as an orientation detector, and is configured to, for example, detect the positions of travel hydraulic motors or idlers provided in the lower traveling body 1 to detect the relative relationship between the orientation of the upper turning body 3 and the orientation of the lower traveling body 1. The backward travel operation is, for example, an operation to cause the lower traveling body 1 to travel in the backward direction of the cabin 10. Depending on the relative relationship between the orientation of the upper turning body 3 and the orientation of the lower traveling body 1, the backward travel operation may include the operation of pulling a travel lever to the near side and the operation of stepping on a travel pedal on the heel side and may include the operation of pushing a travel lever to the far side and the operation of stepping on a travel pedal on the toe side.

The "backward direction of the cabin 10" may include a direction whose angle to the longitudinal axis 3X of the upper turning body 3 is within a predetermined range. For example, the "backward direction of the cabin 10" may include a direction that causes the angle (absolute value) of the longitudinal axis 1X of the lower traveling body 1 to the longitudinal axis 3X of the upper turning body 3 to be smaller than or equal to the angle α as illustrated in FIGS. 4A and 4E. Furthermore, the "backward direction of the cabin 10" may include a direction that causes the angle (absolute value) of the longitudinal axis 1X of the lower traveling body 1 to the longitudinal axis 3X of the upper turning body 3 to be within the range of −180 degrees to −β, the range of −α to +α, or the range of +β to +180 degrees as illustrated in FIGS. 4B, 4C, 4F and 4G.

According to this configuration, the shovel 100 can alert a person engaged in the work of the shovel 100 when the backward travel operation is performed. Specifically, the shovel 100 can notify the operator of the shovel 100 that the backward travel operation has been performed. Therefore, in the case of having failed to check backward, the operator of the shovel 100 can check backward after being alerted. Furthermore, in the case of having accidentally performed the backward travel operation despite the intention to move the shovel 100 forward, the operator can cancel the backward travel operation at an early point. This means, for example, that even when the operator has performed the forward travel operation or the backward travel operation while misunderstanding the relationship between the orientation of the lower traveling body 1 and the orientation of the upper turning body 3 after having repeatedly performed a turning operation, the shovel 100 can immediately make the operator aware of the misunderstanding by so informing the operator while the pilot pressure is still within the dead zone region.

Furthermore, the shovel 100 can notify a worker working around the shovel 100 that the backward travel operation has been performed. Therefore, a worker working around the shovel 100 can be aware that the backward travel operation of the shovel 100 has been performed at an early point.

The alarm device 49 may also be configured to output another alarm different from the above-noted alarm (backward travel alarm) when the forward travel operation has been performed through the travel operating apparatus 26A. The configuration of outputting another alarm includes the configuration of outputting no alarm. That is, the alarm device 49 may be configured to, for example, output no alarm when the forward travel operation has been performed through the travel operating apparatus 26A. This configuration is for, for example, enabling the notification target person to distinguish between a particular alarm that is output only when the determining part 31 determines that a predetermined condition is satisfied and an alarm that is output when the travel operating apparatus 26A is merely operated.

Specifically, it is assumed that when the travel operating apparatus 26A is operated, a travel alarm is output irrespective of the direction of the operation. In this case, if the backward travel alarm and the travel alarm are audio alarms of the same configuration, a person who hears the audio alarms cannot distinguish between the respective meanings of the audio alarms. That is, a person who hears the audio alarms cannot determine whether the shovel 100 is going to move forward or backward. The above-described configuration can prevent the occurrence of such a situation.

Furthermore, the alarm device 49 may also be configured to output an alarm when the amount of operation of the travel operating apparatus 26A is within the dead zone region. According to this configuration, the alarm device 49 can notify the operator of the shovel 100 that the backward travel operation has been performed before the shovel 100 actually starts to move in response to the backward travel operation.

Furthermore, the shovel 100 may include the display device 40 that displays an image related to the travel direction of the lower traveling body 1 corresponding to the tilt direction of the travel operating apparatus 26A. In this case, the image related to the travel direction may be configured to successively change according to the turning state of the upper turning body 3. The image related to the travel direction is generated by, for example, the image generating part 33.

FIGS. 6A through 6E illustrate five examples of peripheral monitoring images displayed on the image display part 41 of the display device 40. Each of the five peripheral monitoring images is generated by the image generating part 33, and includes a shovel graphic shape GA representing the shovel 100, a partially circular (see FIGS. 6A through 6D) or circular (see FIG. 6E) camera image GB placed along the periphery or around the shovel graphic shape GA, and an image GD related to the travel direction of the lower traveling body 1 corresponding to the tilt direction of the travel operating apparatus 26A. The shovel graphic shape GA includes a graphic shape representing the lower traveling body 1 and a graphic shape representing the upper turning body 3. The positional relationship between the graphic shape representing the lower traveling body 1 and the graphic shape representing the upper turning body 3 may change according as the positional relationship between the lower traveling body 1 and the upper turning body 3 changes. The camera image GB may be, for example, either an overhead view image serving as a virtual viewpoint image generated by synthesizing the respective captured images of the back camera 80B, the left camera 80L, and the right camera 80R (see FIGS. 6A through 6D), or an overhead view image serving as a virtual viewpoint image generated by synthesizing the respective captured images of the front camera, the back camera 80B, the left camera 80L, and the right camera 80R (see FIG. 6E). The image GD is, for example, an arrow that represents the travel direction of the lower traveling body 1 when the right and left travel operating apparatuses 26A (travel levers) are pulled to the near side.

Figure 6A:
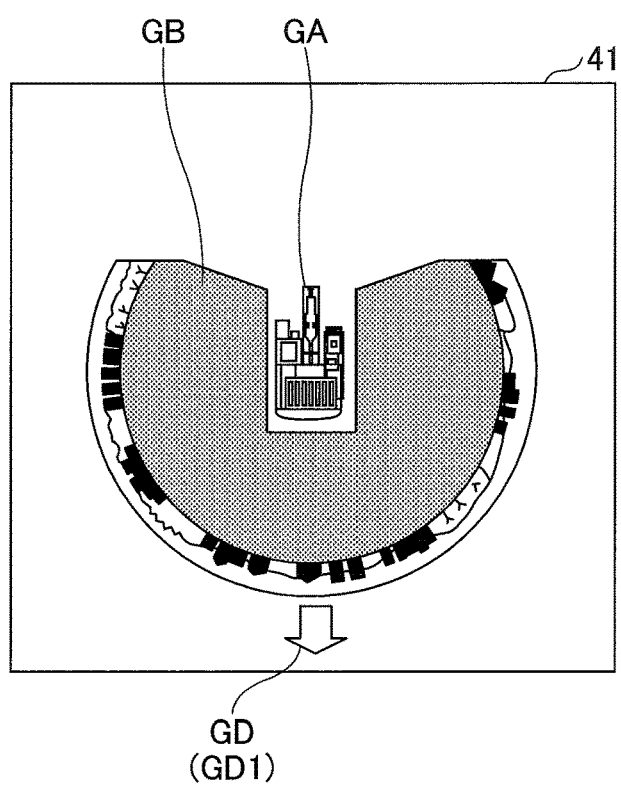
FIGS. 6A through 6E are diagrams illustrating examples of peripheral monitoring images.

Specifically, FIG. 6A illustrates a peripheral monitoring image that is displayed when the shovel 100 is in the state illustrated in FIG. 4A. An image GD1 represents that the lower traveling body 1 moves backward relative to the upper turning body 3 when the right and left travel operating apparatuses 26A are pulled to the near side.

Figure 6B:
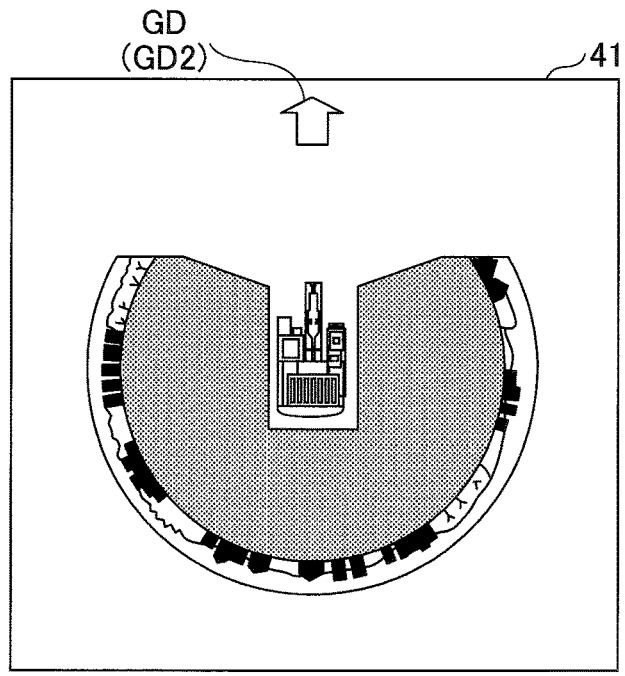

FIG. 6B illustrates a peripheral monitoring image that is displayed when the shovel 100 is in the state illustrated in FIG. 4E. An image GD2 represents that the lower traveling body 1 moves forward relative to the upper turning body 3 when the right and left travel operating apparatuses 26A are pulled to the near side.

Figure 6C:
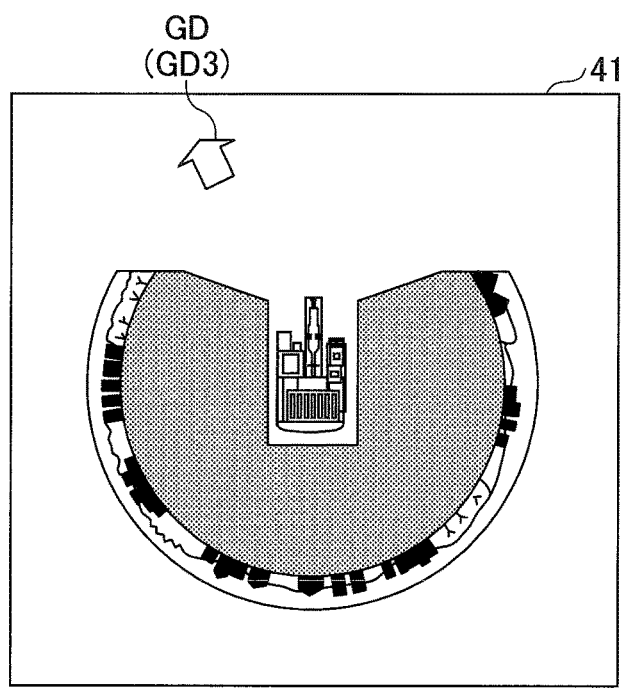

FIG. 6C illustrates a peripheral monitoring image that is displayed when the shovel 100 is in the state illustrated in FIG. 4F. An image GD3 represents that the lower traveling body 1 moves obliquely forward to the left relative to the upper turning body 3 when the right and left travel operating apparatuses 26A are pulled to the near side.

Figure 6D:
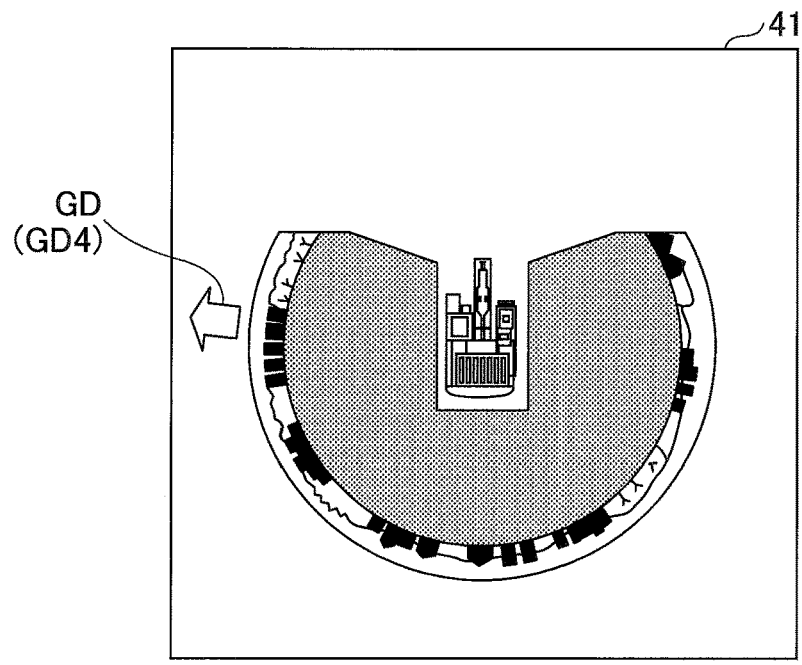

FIG. 6D illustrates a peripheral monitoring image that is displayed when the shovel 100 is in the state illustrated in FIG. 4H. An image GD4 represents that the lower traveling body 1 moves leftward relative to the upper turning body 3 when the right and left travel operating apparatuses 26A are pulled to the near side.

Figure 6E:
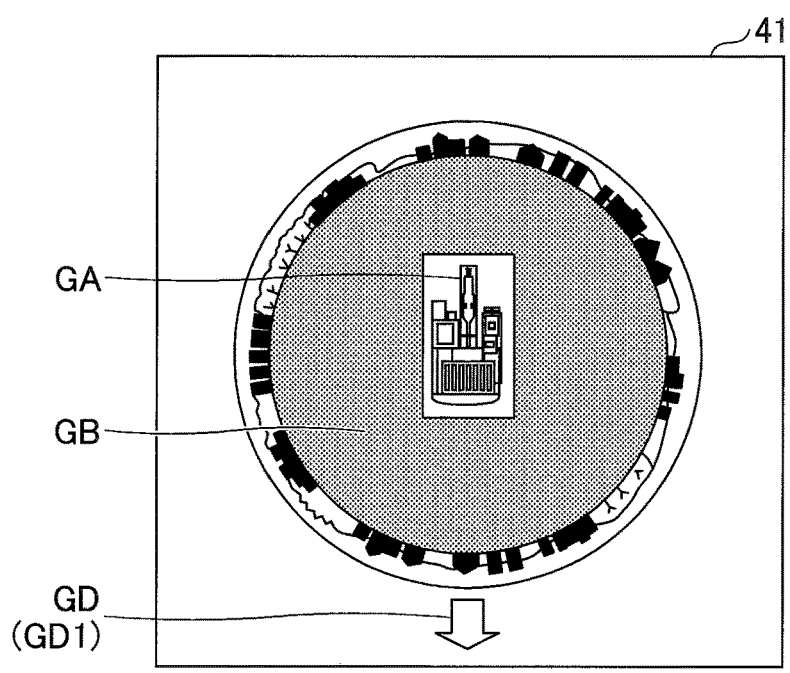

FIG. 6E illustrates a peripheral monitoring image that is displayed when the shovel 100 is in the state illustrated in FIG. 4A. The image GD1 represents that the lower traveling body 1 moves backward relative to the upper turning body 3 when the right and left travel operating apparatuses 26A are pulled to the near side. According to the example of FIG. 6E, the camera image GB is an overhead view image of 360 degrees around the shovel 100.

According to this configuration, the shovel 100 can display the positional relationship between the lower traveling body 1 and the upper turning body 3 on the display device 40. Specifically, the travel direction of the lower traveling body 1 relative to the upper turning body 3 when the right and left travel operating apparatuses 26A are pulled to the near side can be continuously displayed. Therefore, by looking at a peripheral monitoring image displayed on the image display part 41 of the display device 40, the shovel operator can intuitively understand the travel direction of the lower traveling body 1 relative to the upper turning body 3 when the right and left travel operating apparatuses 26A are pulled to the near side. As a result, the operator can prevent the shovel 100 from moving in an unexpected direction.

The direction of the arrow displayed as the image CD on the image display part 41 of the display device 40 may be determined with an accuracy finer than 10° or determined with an accuracy coarser than 10° to serve as a rough indicator of the travel direction.

The shovel 100 may cause the arrow serving as the image CD to blink, may display a graphic shape other than an arrow as the image CD, and may cause a portion of the image corresponding to the travel direction of the lower traveling body 1 relative to the upper turning body 3 when the right and left travel operating apparatuses 26A are pulled to the near side to be filled with a predetermined color or blink.

For example, the shovel 100 may display predetermined images at intervals of a predetermined angle on a circular arc of the camera image GB. The predetermined angle is, for example, 10°. The predetermined angle, however, may be either an angle greater than 10° or an angle smaller than 10°. The predetermined images are, for example, scale mark images. The shovel 100 may cause one of the predetermined images corresponding to the travel direction of the lower traveling body 1 relative to the upper turning body 3 when the right and left travel operating apparatuses 26A (travel levers) are pulled to the near side or when the right and left travel operating apparatuses 26A (travel levers) are pushed to the far side to be filled with a predetermined color or blink.

Furthermore, the shovel 100 may be configured to continuously display the travel direction of the lower traveling body 1 relative to the upper turning body 3 when the right and left travel operating apparatuses 26A (travel levers) are pushed to the far side. That is, the shovel 100 may be configured to constantly display the travel direction of the lower traveling body 1 relative to the upper turning body 3 regardless of whether the right and left travel operating apparatuses 26A (travel levers) are operated.

Furthermore, according to the above-described embodiment, the shovel 100 is configured to constantly display the travel direction of the lower traveling body 1 relative to the upper turning body 3 when the right and left travel operating apparatuses 26A (travel levers) are pulled to the near side or when the right and left travel operating apparatuses 26A (travel levers) are pushed to the far side. The shovel 100, however, may be configured to perform displaying only during the operation of the travel operating apparatus 26A.

Furthermore, the orientation detector 85, which is constituted of a combination of a direction sensor attached to the lower traveling body 1 and a direction sensor attached to the upper turning body 3 according to the above-described embodiment, may be a turning angle sensor. The turning angle sensor may be, for example, placed at a center joint provided in relation to a mechanism that achieves relative rotation between the lower traveling body 1 and the upper turning body 3.

Next, a main screen including a peripheral monitoring image is described with reference to FIGS. 7 and 8. FIGS. 7 and 8 illustrate example configurations of a main screen 41V displayed on the image display part 41 of the display device 40. According to this embodiment, the main screen 41V is displayed while the shovel 100 is in operation.

As illustrated in FIGS. 7 and 8, the main screen 41V includes a date and time display area 41a, a travel mode display area 41b, an attachment display area 41c, a fuel efficiency display area 41d, an engine control status display area 41e, an engine operating time display area 41f, a coolant water temperature display area 41g, a remaining fuel amount display area 41h, a rotational speed mode display area 41i, a remaining aqueous urea solution amount display area 41j, a hydraulic oil temperature display area 41k, and a peripheral monitoring image display area 41m.

The date and time display area 41a is an area for displaying a current date and time. The travel mode display area 41b is an area for displaying a current travel mode. The attachment display area 41c is an area for displaying an image that represents a currently attached attachment. The fuel efficiency display area 41d is an area for displaying fuel efficiency information calculated by the controller 30. The fuel efficiency display area 41d includes an average fuel efficiency display area 41d1 for displaying a lifelong average fuel efficiency or section average fuel efficiency and an instantaneous fuel efficiency display area 41d2 for displaying instantaneous fuel efficiency.

The engine control status display area 41e is an area for displaying the control status of the engine 11. The engine operating time display area 41f is an area for displaying the cumulative operating time of the engine 11. The coolant water temperature display area 41g is an area for displaying a current temperature condition of engine coolant water. The remaining fuel amount display area 41h is an area for displaying the state of the remaining amount of fuel stored in a fuel tank. The rotational speed mode display area 41i is an area for displaying, as an image, a current rotational speed mode set with the engine rotational speed adjustment dial 75. The remaining aqueous urea solution amount display area 41j is an area for displaying, as an image, the state of the remaining amount of an aqueous urea solution stored in an aqueous urea solution tank. The hydraulic oil temperature display area 41k is an area for displaying the state of the temperature of hydraulic oil in the hydraulic oil tank.

The peripheral monitoring image display area 41m is an area for displaying a peripheral monitoring image. According to the example of FIG. 7, the peripheral monitoring image illustrated in FIG. 6A, namely, a peripheral monitoring image that is displayed when the shovel 100 is in the state illustrated in FIG. 4A, is displayed in the peripheral monitoring image display area 41m. According to the example of FIG. 8, a back side image captured by the back camera 80B (an image not subjected to a viewpoint change process) is displayed as a peripheral monitoring image in the peripheral monitoring image display area 41m. The example of FIG. 8 is an example of the main screen 41V that is displayed when the shovel 100 is in the state illustrated in FIG. 4B. An image GD5 represents a direction in which the lower traveling body 1 moves when the right and left travel operating apparatuses 26A are pulled to the near side.

Thus, the shovel 100 can display the main screen 41V including a peripheral monitoring image on the image display part 41. Therefore, the operator of the shovel 100 can intuitively understand the travel direction of the lower traveling body 1 relative to the upper turning body 3 when the right and left travel operating apparatuses 26A are pulled to the near side by looking at the peripheral monitoring image while checking various information items displayed on the main screen 41V. As a result, the operator can prevent the shovel 100 from moving in an unexpected direction.

A preferred embodiment of the present invention is described above. The present invention, however, is not limited to the above-described embodiment. Various variations, replacements, etc., may be applied to the above-described embodiment without departing from the scope of the present invention. Furthermore, the features described with reference to the above-described embodiment may be suitably combined as long as causing no technical contradiction.

Figure 9:
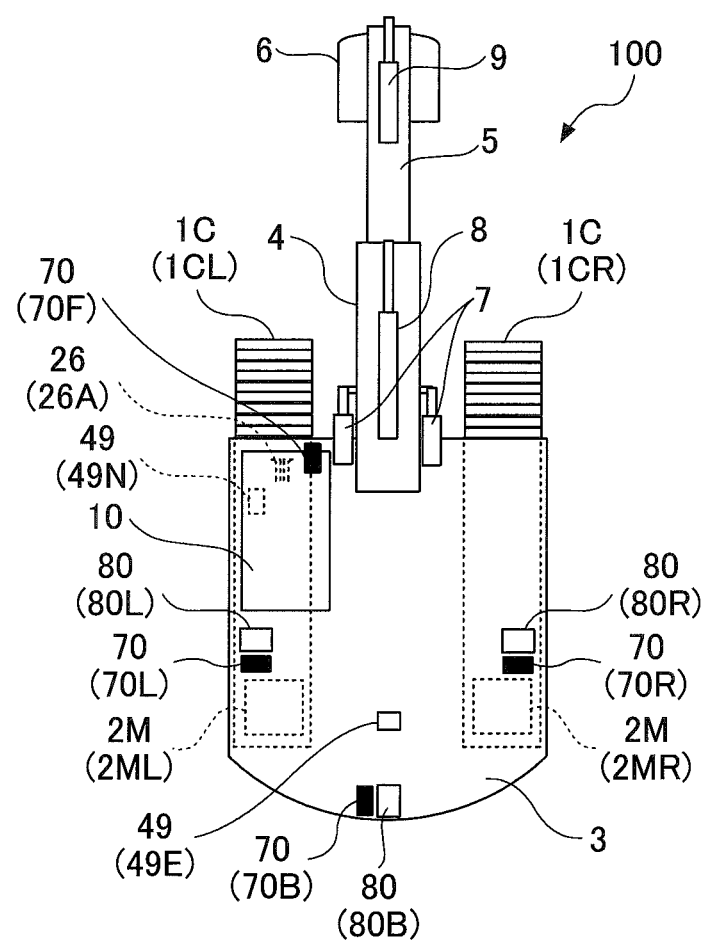
FIG. 9 is a plan view of the shovel including a space recognition device.

For example, as illustrated in FIG. 9, the shovel 100 may include an object detector (a space recognition device 70) separately from the camera 80. FIG. 9 is a plan view of the shovel 100 including the space recognition device 70.

The space recognition device 70 is configured to be able to detect an object present in a three-dimensional space around the shovel 100. Furthermore, the space recognition device 70 may be configured to be able to calculate the distance between the space recognition device 70 or the shovel 100 and a detected object. Examples of objects include entering objects such as persons, animals and machines and stationary objects such as buildings. Examples of the space recognition device 70 include an ultrasonic sensor, a millimeter wave radar, a monocular camera, a stereo camera, a LIDAR, a distance image sensor, and an infrared sensor. According to the example illustrated in FIG. 9, a LIDAR serving as the space recognition device 70 is constituted of a front sensor 70F attached to the front end of the upper surface of the cabin 10, a back sensor 70B attached to the back end of the upper surface of the upper turning body 3, a left sensor VOL attached to the left end of the upper surface of the upper turning body 3, and a right sensor 70R attached to the right end of the upper surface of the upper turning body 3. An upper sensor configured to detect an object present in a space above the upper turning body 3 may be attached to the shovel 100.

The back sensor 70B is placed next to the back camera 80B, the left sensor 70L is placed next to the left camera 80L, and the right sensor 70R is placed next to the right camera 80R. A front camera may be placed next to the front sensor 70F in its vicinity.

Figure 10:
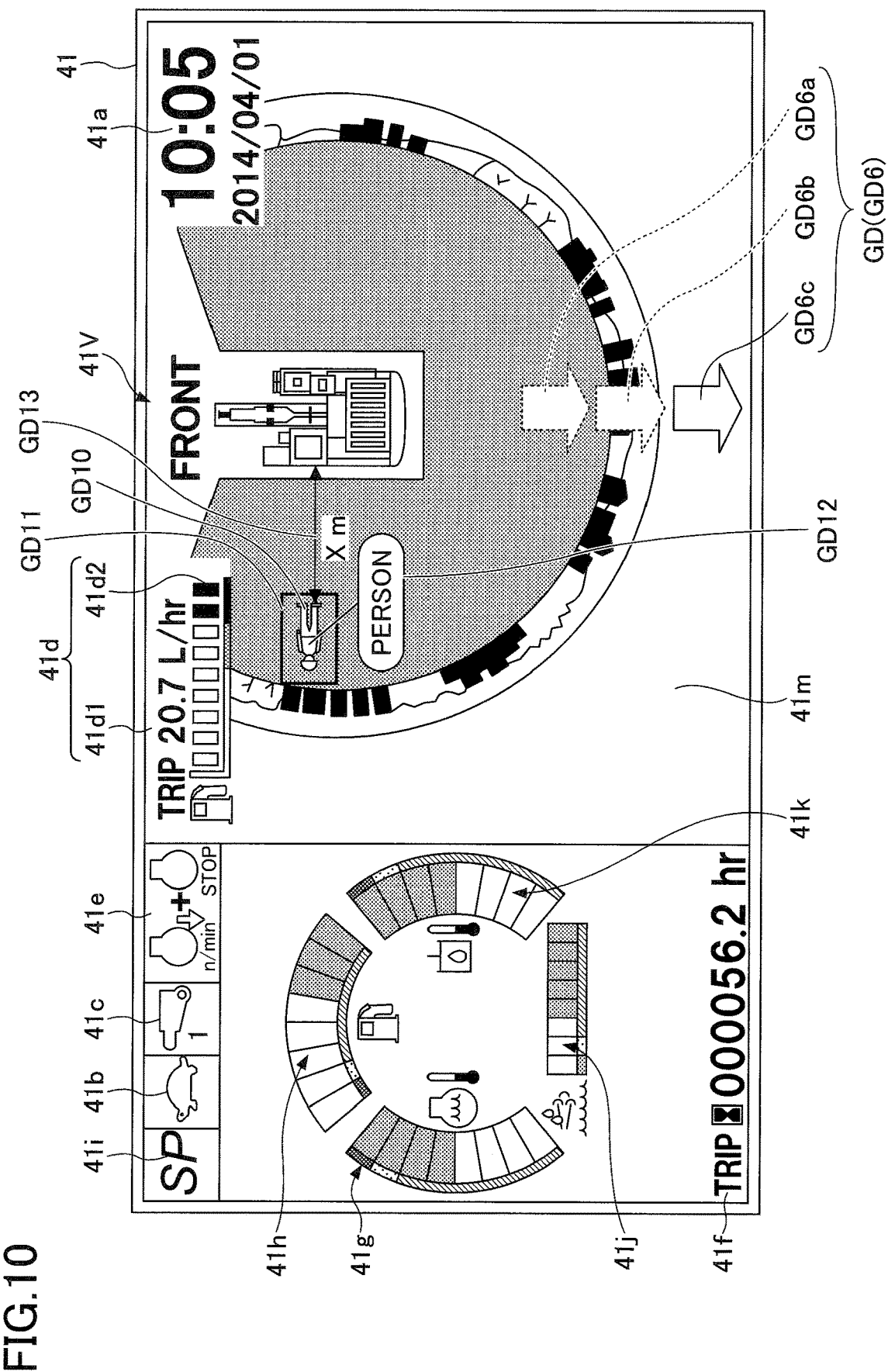
FIG. 10 is a diagram illustrating another example configuration of the main screen.

The shovel 100 may cause the detection result of the space recognition device 70 to be displayed on the display device 40 installed in the cabin 10, along with an image captured by the camera 80. Specifically, as illustrated in FIG. 10, the shovel 100 may be configured to be able to display an overhead view image generated by synthesizing the respective output images of the back camera 80B, the left camera 80L, and the right camera 80R on the display device 40, along with the detection result of the space recognition device 70. FIG. 10 illustrates another example configuration of the main screen 41V displayed on the image display part 41 of the display device 40. The main screen 41V of FIG. 10 is different in including an image GD11 for highlighting an image GD10 of an object detected by the space recognition device 70, including an image GD12 representing the type of the object detected by the space recognition device 70, including an image GD13 representing the distance between the shovel 100 and the object, and including an image GD6 representing the travel direction of the lower traveling body 1 from, but otherwise equal to, the main screen 41V of FIG. 7. The main screen 41V may include an image that represents the size of the object (for example, the height of a person as the object).

According to the example of FIG. 10, the image GD6 is an animated image that represents the travel direction of the lower traveling body 1. Specifically, the image GD6 includes images GD6a through GD6c, and is displayed to be seen as if an arrow image were moving in the backward travel direction of the lower traveling body 1. That is, the image GD6 is displayed to be seen as if an arrow image were moving in the backward travel direction of the lower traveling body 1 so that the operator can intuitively understand the backward travel direction of the lower traveling body 1. More specifically, the shovel 100 causes the operator to be aware of the travel direction of the lower traveling body 1 by repeatedly displaying downward arrows intermittently in order of the image GD6a, the image GD6b, the image GD6c, the image GD6a, the image GD6b, the image GD6c, ... such that the downward arrows are seen as if to be a moving arrow image. The shovel 100 does not simultaneously display two or more of the images GD6a through GD6c. FIG. 10 illustrates that at present, the image GD6c indicated by a solid line is displayed and the image GD6a and the image GD6b indicated by a dashed line are not displayed.

According to this configuration, the operator who looks at the main screen 41V of FIG. 10 can understand the travel direction of the lower traveling body 1 by, for example, seeing the image GD6 with peripheral vision without staring at the peripheral monitoring image display area 41m.

The shovel 100 identifies a portion of the overhead view image at which the image GD10 of the object (person) is detected by the space recognition device 70 is positioned based on the output of the space recognition device 70, and displays the identified portion with highlighting using the image GD11 so that the operator can distinguish the identified portion from other portions.

According to the example of FIG. 10, the image GD11 is an image of a frame surrounding the image GD10 of the objected detected by the space recognition device 70. The image GD11, however, may alternatively be an image of an arrow pointing at the image GD10 of the object or an image other than a frame and an arrow. Furthermore, the shovel 100 may cause the image GD11 to blink. Alternatively, the shovel 100 may change at least one of the luminance, color, etc., of a portion corresponding to the image GD11 so that the portion corresponding to the image GD11 stands out from its surrounding portion.

According to the example of FIG. 10, the image GD12 is an image of a balloon containing "PERSON" that are letters representing the type of the object detected by the space recognition device 70. The start point of the balloon is configured to coincide with the center point of the image GD11, for example.

According to the example of FIG. 10, the image GD12 includes a double-headed arrow representing the distance between the object detected by the space recognition device 70 and the shovel 100 and the value of the distance displayed near the double-headed arrow.

Thus, the shovel 100 can display a portion including an image of the object detected by the space recognition device 70 with highlighting so that the operator of the shovel 100 can be easily aware of the presence of the object. Therefore, the operator of the shovel 100 can be aware of the presence of the object by looking at an image displayed on the display device 40 when performing the backward travel operation or the like.

Furthermore, when multiple objects are detected by the space recognition device 70, the shovel 100 may cause the way the objects are displayed with highlighting to differ depending on the level of danger of the objects. The level of danger is so set as to increase as the distance between the shovel 100 and the object decreases. Specifically, the shovel 100 may cause the objects to differ by the way of being displayed with highlighting such that a portion at which an image of a person closer to the shovel 100 is positioned is more conspicuous than a portion at which an image of a person more distant from the shovel 100 is positioned.

Furthermore, when the object indicated by the image GD11 is detected in the travel direction of the lower traveling body 1 indicated by the image GD6, the shovel 100 may display the image GD11 in a different manner, that is, in such a manner that a portion corresponding to the image GD11 is more conspicuous, than in the case where an object present in a direction other than the direction indicated by the image GD6 is detected. This is for ensuring that the operator of the shovel 100 is aware of the presence of an object in the backward travel direction of the shovel 100 by further alerting the operator.

According to this configuration, the operator who looks at the main screen 41V of FIG. 10 can be aware of the presence of an object in the backward travel direction of the lower traveling body 1 by, for example, seeing the image GD11 with peripheral vision without staring at the peripheral monitoring image display area 41m.

Figure 11:
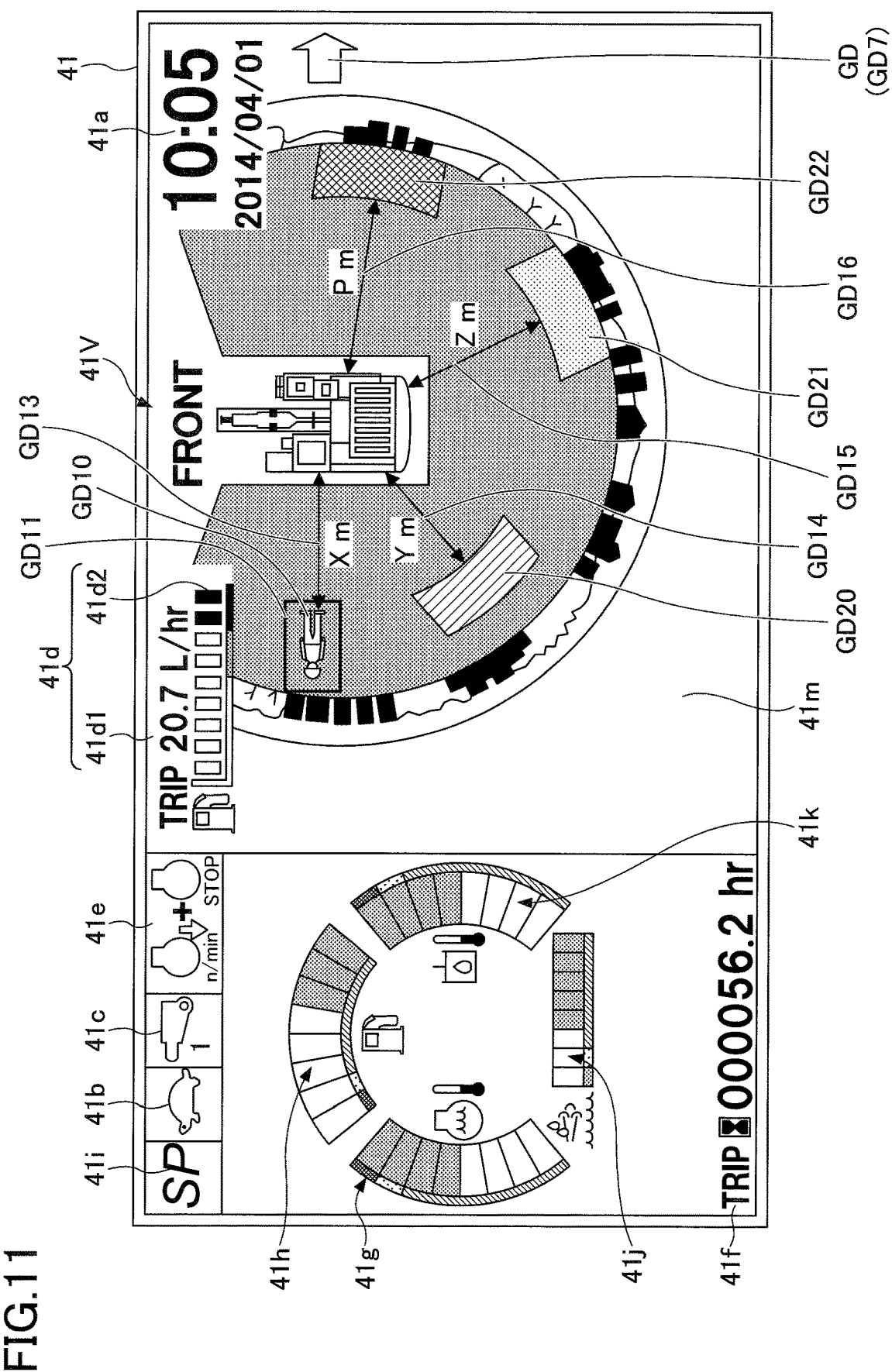
FIG. 11 is a diagram illustrating yet another example configuration of the main screen.

FIG. 11 illustrates yet another example configuration of the main screen 41V displayed on the image display part 41 of the display device 40. The main screen 41V of FIG. 11 is different in mainly including an image GD20 representing an off-limits area, an image GD21 representing a dangerous area, an image GD22 representing a target work area, an image GD14 representing the distance between the off-limits area and the shovel 100, an image GD15 representing the distance between the dangerous area and the shovel 100, and an image GD16 representing the distance between the target work area and the shovel 100 from, but otherwise equal to, the main screen 41V of FIG. 10. Therefore, a description of a common portion is omitted, and differences are described in detail.

The off-limits area is an area which the shovel 100 is restricted from entering. The off-limits area is, for example, an area surrounded by pylons. In the off-limits area, typically, various kinds of work are performed by workers or the like.

The dangerous area is an area which the shovel 100 enters to be in a dangerous condition. The dangerous condition is, for example, a condition that may cause overturning. Specifically, the dangerous area is an area where there is a cliff, the top of a slope, a pit hole or the like. The boundary of a cliff, the top of a slope, a pit hole or the like may be displayed with highlighting.

The target work area is an area where the shovel 100 performs work. Examples of work performed by the shovel 100 include the loading work of loading earth or the like onto the bed of a dump truck and the banking work of forming a bank having a predetermined shape with earth or the like.

An image GD7 represents a direction in which the lower traveling body 1 moves when the right and left travel operating apparatuses 26A are pulled to the near side.

The shovel 100 may identify the position and the range of at least one of the off-limits area, the dangerous area, and the target work area based on the output of at least one of the space recognition device 70 and the camera 80, for example. Alternatively, the shovel 100 may identify the position and the range of at least one of the off-limits area, the dangerous area, and the target work area based on recorded information such as terrain data or design data prestored in a nonvolatile storage device.

The shovel 100 may be configured to display, as information on the target work area, at least one of work contents, the expected duration of work, the expected start time of work, the expected finish time of work, the expected amount of work, etc., on the image display part 41.

According to this configuration, the operator who looks at the main screen 41V of FIG. 11 can easily understand the positions and the ranges of the off-limits area, the dangerous area, the target work area, etc., the position of the detected object, and the travel direction of the lower traveling body 1, and can execute a safer travel operation.

Figure 12:
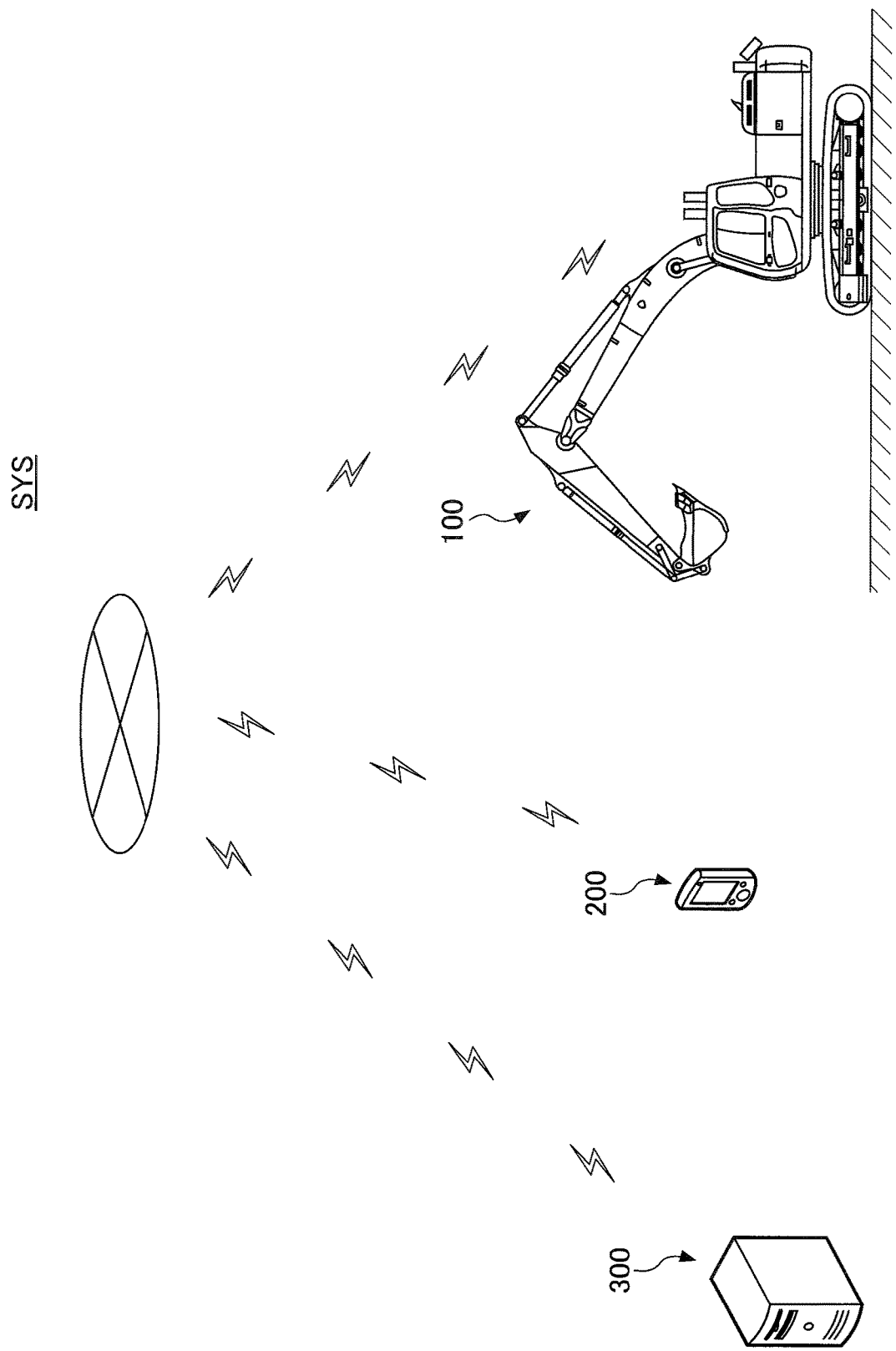
FIG. 12 is a schematic diagram illustrating an example configuration of a shovel management system.

The detection result of the space recognition device 70 may be shared with a manager, other shovel operators, etc., through a shovel management system SYS as illustrated in FIG. 12. FIG. 12 is a schematic diagram illustrating an example configuration of the shovel management system SYS. The management system SYS is a system that manages the shovel 100. According to this embodiment, the management system SYS is constituted mainly of the shovel 100, an assist device 200, and a management apparatus 300. Each of the shovel 100, the assist device 200, and the management apparatus 300 constituting the management system SYS may be one or more in number. According to this embodiment, the management system SYS includes the single shovel 100, the single assist device 200, and the single management apparatus 300.

The assist device 200 is a portable terminal device, and is, for example, a computer such as a notebook PC, a tablet PC, or a smartphone carried by a worker or the like at a work site. The assist device 200 may also be a computer carried by the operator of the shovel 100.

The management apparatus 300 is a stationary terminal device, and is, for example, a server computer installed in a management center or the like outside a work site. The management apparatus 300 may also be a portable computer (for example, a portable terminal device such as a notebook PC, a tablet PC, or a smartphone).

According to the management system SYS of FIG. 12, when the space recognition device 70 detects an object, the shovel 100 transmits information on the object (hereinafter, "object information") to at least one of the assist device 200 and the management apparatus 300. The object information includes, for example, at least one of an image of the object, the size of the object, the type of the object, the position of the object, the distance between the object and the shovel 100, etc. In response to receiving the object information, the at least one of the assist device 200 and the management apparatus 300 displays an image related to the object information on a display device pertaining thereto.

The image related to the object information is typically such an image as is displayed in the peripheral monitoring image display area 41m in each of FIGS. 10 and 11. Therefore, a worker who uses the assist device 200, a manager who uses the management apparatus 300, or the like can view the same screen as the main screen 41V that the operator of the shovel 100 views on the image display part 41 of the display device 40.

Furthermore, the object information may be not only information obtained by the space recognition device 70, etc., but also information input by a worker through the assist device 200. In this case, information input through the assist device 200 may be transmitted to at least one of the shovel 100 and the management apparatus 300 through radio communications.

Based on the above-described configuration, the management system SYS enables a user who uses the management system SYS such as an operator, a worker or a manager outside the shovel 100 to check the surroundings of the shovel 100.

Therefore, when the shovel 100 is provided as a remotely controllable shovel, a user who uses the management system SYS can easily understand a direction in which the lower traveling body 1 faces when remotely controlling the shovel 100. In the case of operating the shovel 100 in the cabin 10, the operator can check the orientation of the lower traveling body 1 by actually seeing the lower traveling body 1. In contrast, in the case of remotely controlling the shovel 100, the operator cannot actually see the lower traveling body 1 and may therefore be unable to check the orientation of the lower traveling body 1. In such a case, the operator who performs remote control can check the orientation of the lower traveling body 1 by, for example, viewing information displayed on a display device pertaining to the assist device 200 or the management apparatus 300.

When such a travel operation as to move the shovel 100 toward an object detected by the space recognition device 70 has been performed, the shovel 100 may transmit information on the operation of the shovel 100, information on the state of the shovel 100, etc., in addition to the object information, to at least one of the assist device 200 or the management apparatus 300. This is for enabling a manager or the like to conduct an ex post analysis of the reason the operation to move the shovel 100 toward the object has been performed.

What is claimed is:

1. A shovel comprising:
   a lower traveling body;
   an upper turning body turnably mounted on the lower traveling body;
   a cab provided on the upper turning body;
   an orientation detector configured to detect a relative relationship between an orientation of the upper turning body and an orientation of the lower traveling body; and
   an alarm device configured to output an alarm when a backward travel operation is performed while it is determined that the relative relationship between the orientation of the upper turning body and the orientation of the lower traveling body detected by the orientation detector satisfies a predetermined condition,
   wherein the backward travel operation is an operation to cause the lower traveling body to travel in a backward direction of the upper turning body.

2. The shovel as claimed in claim 1, wherein
   the alarm device is configured to output another alarm different from said alarm when a forward travel operation is performed, and
   the forward travel operation is an operation to cause the lower traveling body to travel in a forward direction of the upper turning body.

3. The shovel as claimed in claim 1, wherein the backward direction of the upper turning body includes a direction whose angle to a longitudinal axis of the upper turning body is within a predetermined range.

4. The shovel as claimed in claim 1, wherein the alarm device is configured to output the alarm when a travel operating apparatus is in a dead zone region.

5. The shovel as claimed in claim 1, further comprising:
   a display device configured to display an image related to a travel direction of the lower traveling body corresponding to a tilt direction of a travel operating apparatus.

6. The shovel as claimed in claim 5, wherein the image related to the travel direction successively changes according to a turning state of the upper turning body.

7. The shovel as claimed in claim 1, further comprising:
   a turning angle sensor placed at a center joint of the shovel.

8. A shovel comprising:
   a lower traveling body;
   an upper turning body turnably mounted on the lower traveling body;
   a cab provided on the upper turning body;
   an orientation detector configured to detect a relative relationship between an orientation of the upper turning body and an orientation of the lower traveling body; and
   a display device provided in the cab,
   wherein an image related to a travel direction of the lower traveling body is displayed with respect to an overhead view image of an area surrounding the shovel on the display device, and
   a position of the image displayed with respect to the overhead view image moves around the overhead view image according to the relative relationship between the orientation of the upper turning body and the orientation of the lower traveling body.

9. The shovel as claimed in claim 8, wherein a positional relationship between the upper turning body and the lower traveling body is displayed on the display device.

10. The shovel as claimed in claim 8, wherein
    the overhead view image includes a graphic shape representing the upper turning body and a graphic shape representing the lower traveling body, and
    a positional relationship between the graphic shape representing the upper turning body and the graphic shape representing the lower traveling body changes according as a positional relationship between the upper turning body and the lower traveling body changes.

11. An output device of a shovel, configured to output information on the shovel, wherein
    the output device is configured to output an alarm when an operation to cause a lower traveling body of the shovel to travel in a backward direction of an upper turning body of the shovel is performed while it is determined that a relative relationship between an orientation of the upper turning body and an orientation of the lower traveling body detected by an orientation detector of the shovel satisfies a predetermined condition.

12. An output device of a shovel, configured to output information on the shovel, wherein
    the output device is configured to display, with respect to an overhead view image of an area surrounding the shovel, an image related to a travel direction of a lower traveling body of the shovel, and
    a position of the image displayed with respect to the overhead view image moves around the overhead view image according to a relative relationship between an orientation of an upper turning body of the shovel and an orientation of the lower traveling body.

13. A shovel comprising:
    a lower traveling body;
    an upper turning body turnably mounted on the lower traveling body;
    a cab provided on the upper turning body;
    an orientation detector configured to detect a relative relationship between an orientation of the upper turning body and an orientation of the lower traveling body;
    a display device provided in the cab; and
    a plurality of cameras configured to capture respective images of an area surrounding the shovel,
    wherein an image related to a travel direction of the lower traveling body is displayed with respect to an overhead view image of the area surrounding the shovel on the display device, and
    the overhead view image is a virtual viewpoint image generated by synthesizing the respective captured image of the plurality of cameras.

14. The output device as claimed in claim 12, wherein the overhead view image is a virtual viewpoint image generated by synthesizing images of the area surrounding the shovel captured by a plurality of cameras of the shovel.

* * * * *